United States Patent
Shah

(10) Patent No.: US 11,757,871 B1
(45) Date of Patent: Sep. 12, 2023

(54) VOICE COMMAND SECURITY AND AUTHORIZATION IN USER COMPUTING DEVICES

(71) Applicant: T-Mobile USA, Inc., Bellevue, WA (US)

(72) Inventor: Darshan Shah, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 232 days.

(21) Appl. No.: 17/374,381

(22) Filed: Jul. 13, 2021

(51) Int. Cl.
*H04L 9/40* (2022.01)
*H04W 12/64* (2021.01)
*G10L 17/22* (2013.01)
*H04M 1/72463* (2021.01)

(52) U.S. Cl.
CPC .......... *H04L 63/0861* (2013.01); *G10L 17/22* (2013.01); *H04M 1/72463* (2021.01); *H04W 12/64* (2021.01); *H04M 2201/41* (2013.01)

(58) Field of Classification Search
CPC ............... H04L 63/0861; G10L 17/22; H04M 1/72463; H04M 2201/41; H04W 12/065; G06F 21/32
See application file for complete search history.

(56) References Cited

U.S. PATENT DOCUMENTS

| | | | |
|---|---|---|---|
| 11,127,405 B1 | 9/2021 | Antos et al. | |
| 2012/0032945 A1 | 2/2012 | Dare et al. | |
| 2015/0051913 A1 | 2/2015 | Choi | |
| 2015/0245388 A1 | 8/2015 | Yerrabommanahalli et al. | |
| 2018/0014189 A1* | 1/2018 | Ellison | H04W 12/06 |
| 2018/0247065 A1 | 8/2018 | Rhee et al. | |
| 2019/0043510 A1* | 2/2019 | Wang | H04L 43/16 |
| 2021/0256979 A1* | 8/2021 | Zhang | H04R 1/08 |
| 2022/0191683 A1 | 6/2022 | Shah | |

OTHER PUBLICATIONS

Office Action for U.S. Appl. No. 17/122,735, dated Jan. 9, 2023, Shah, "Authorized Voice Command Override for Wireless Device Data Capabilities ", 9 pages.

* cited by examiner

*Primary Examiner* — Michael Y Mapa
(74) *Attorney, Agent, or Firm* — Lee & Hayes, P.C.

(57) ABSTRACT

Techniques described herein include receiving, authorizing, and processing voice commands to control computing devices and perform various device capabilities. In some examples, a user computing device may implement voice command functionality using multiple independent components, with shared security credentials established between different combinations of components. An intermediate voice authorization component may receive and compare voice input data received from a user interface component with voice template data stored securely by a voice data component, to protect against a component becoming compromised by malware or exposure to an untrusted system. Voice commands may be used to execute, disable, or enable various capabilities on the user device, including different device applications and features, and may be authorized by different users with various security and authorization techniques.

20 Claims, 11 Drawing Sheets

| User | Auth Command | Enable/Disable | Wireless Data Type(s) | Applications/ Features | Secondary Auth. Required? |
|---|---|---|---|---|---|
| User 1 | Auth Command 1 | Disable | All | All | No |
| User 2 | Auth Command 1 | Disable | WiFi, Cell Data | All (Map, Updates) | No |
| User 2 | Auth Command 2 | Enable | Cell Data | Social Media | Yes |
| User 3 | Auth Command 3 | Enable | All | Gaming, Video | No |

FIG. 4

VOICE COMMAND SECURITY AND AUTHORIZATION IN USER COMPUTING DEVICES

BACKGROUND

Wireless devices such as smartphones and virtual assistant devices are often designed and configured to connect automatically to available data networks and to begin transmitting and receiving data. For instance, when a user moves between WiFi and cellular data networks, or when the user arrives at a new location (e.g., an airport or business) and turns on their device, the device may automatically detect any available data networks and may connect automatically to begin supporting any data dependent applications and features executing on the device. Although configuring devices to automatically use data from available data networks may be desirable in some cases, such configurations also may result in problems and vulnerabilities affecting device security, increased network traffic, data usage and roaming, and parental control of devices.

Some wireless devices include a settings menu that allow users to enable and disable certain data capabilities, but settings menus can be challenging to use and imprecise. For instance, many smartphones include an "Airplane Mode" or "Flight Mode" feature, but these features disable not only data capabilities but also voice calls, text messages, Wireless Emergency Alert (WEA) and 911 capabilities, and software updates. In order to disable the data capabilities for device applications and features while retaining voice call capabilities and other desired functionality, many wireless devices require a complex multi-step process that includes disabling WiFi on the device, separately disabling cellular data for one or more applications or features, and/or separately disabling various other data capabilities on the device. Each of these steps may require the user to access a different location within the settings menu, which are often non-intuitive and vary depending on the wireless device type, current operating system version, and device applications and features. As a result, users may lack the technical sophistication to successfully disable data capabilities on their wireless device, while retaining voice call capabilities, WEA and 911 capabilities, software updates, and other desired functionality.

Additionally, authorization of voice commands may provide technical challenges for wireless devices or other computing devices that are shared by multiple users and/or potentially compromised by malware or malicious users. As an example, when implementing parental control or other shared device security, a user (e.g., employee or child) may be an authorized user to perform certain voice commands on the device, but might not be authorized to access all of the device capabilities. Additionally, voice verifications systems, especially those within mobile and/or shared user devices, may be vulnerable to malware and hacking attempts in which the device itself, a front-end user interface of the device, and/or a feature/application of the device may be compromised.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a table showing examples of voice command user authorization data associated with disabling and enabling data capabilities on a wireless device, in accordance with certain techniques described herein.

DETAILED DESCRIPTION

Figure 1:
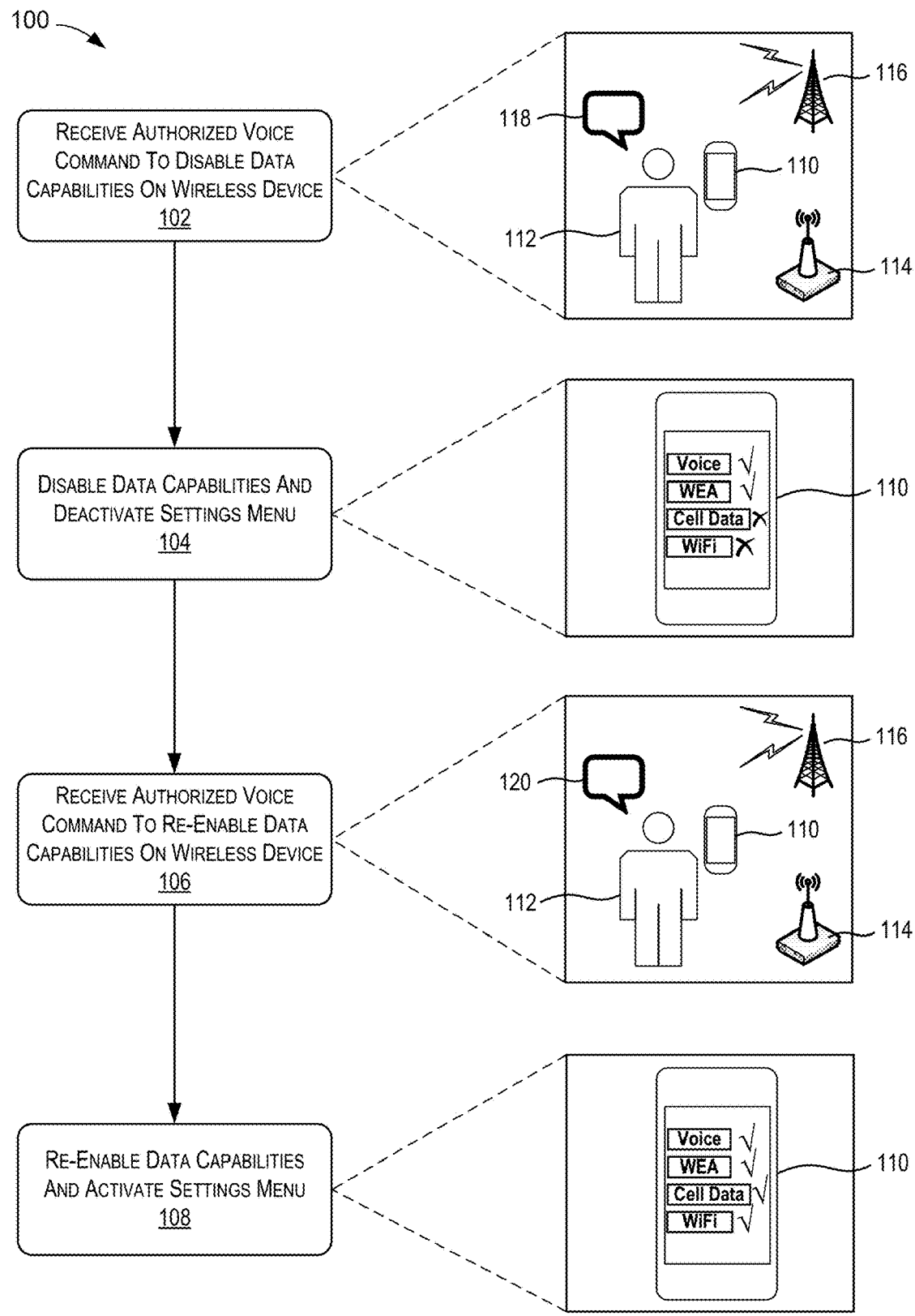
FIG. 1 illustrates a technique for using authorized voice commands to disable and re-enable data capabilities on a wireless device.

This disclosure describes various techniques for receiving, authorizing, and processing voice commands on computing devices, including shared wireless devices and other computing devices. Certain techniques described herein relate to using authorized voice commands to disable and enable data capabilities on wireless devices. In some examples, a single voice command from an authorized user may cause the wireless device to disable multiple data capabilities, such as WiFi and cellular data, while retaining voice call functionality and other desired device capabilities. Authorized voice commands to disable data capabilities also may override the control of the data capabilities by disabling the corresponding user controls within the settings menu of the wireless device. Accordingly, after a voice command is used to disable one or more data capabilities on the wireless device, a second associated voice command may be required to re-enable the disabled data capabilities on the device and reactivate the corresponding user controls within the settings menu. In various examples described below, authorized voice commands may be used to enable or disable different data capabilities on the wireless devices, including different network types and different device applications and features, and may be performed by different authorized users including various user authorization and security techniques.

Additional techniques described herein relate to authorizing voice commands received via a user interface control (e.g., a microphone) by comparing the voice commands to voice template data (e.g., voiceprints) stored securely by the computing device or on a wireless network. Such voice commands may permit authorized users to control the computing device to perform various requested capabilities, while authorized users are not permitted to perform the requested capabilities. In some examples, multiple independent components are implemented, and shared security credentials are established between different combinations of components, to authorize received voice commands. For example, a user interface component receives command requests with voice input data, a voice data component stores user voice templates and/or user-commands associations, and an intermediate voice authorization component receives and compares voice input data from the user interface component with voice template from the voice data component.

The various techniques described herein provide technical improvements in the areas of device security, wireless network security, and network usage management. As described below, managing separate and independent components to process voice inputs, including using shared security credentials between different component combinations, improves security and protects against components becoming compromised by malware or exposure to untrusted individuals or systems.

Additionally, conventional wireless devices may be configured to automatically detect and connect to available wireless networks, resulting in undesirable network connections and data transfers between the wireless devices and unknown and untrusted networks. These connections may result in increased network traffic, excess data usage and network costs incurred by the device, and exposing the device to potential security risks via the unknown and untrusted networks. For conventional wireless devices shared between users (e.g., parent-child, employer-employee, etc.), such devices also may be vulnerable to a non-authorized user (e.g., a child or employee) accessing the settings menu of the device to re-enable the data capabilities that were previously disabled by the authorized user (e.g., a parent or employer). Thus, in conventional systems, non-authorized users of shared devices may easily thwart parental controls to access restricted features, applications, and content via the wireless device.

In contrast to conventional systems, the techniques described herein provide additional network security for wireless devices, by improve voice command authorization and by disabling data capabilities to prevent undesirable connections and data transfers with unknown and untrusted networks. By reliably disabling data capabilities on the wireless device, without disabling voice calls and other network-based functionality, the techniques described herein also improve data efficiency, reducing network traffic and preventing network costs such as excess data and roaming charges for the wireless subscriber. Further, the techniques herein improve parental control and address other vulnerabilities associated with in-person device sharing, by supporting authorized voice commands to disable data capabilities that override the settings menus of the device and prevent re-enabling of the data capabilities by unauthorized users.

FIG. 1 illustrates an example process 100 for using authorized voice commands to disable and re-enable data capabilities on a wireless device. Operations 102-108 represent a process for disabling one or more data capabilities on a wireless device 110 in response to a first voice command from a user 112, and then re-enabling the same data capabilities (or different data capabilities) on the wireless device 110 in response to a second voice command from the user 112 (or a different user).

The wireless device 110 may comprise any type of device capable of wireless communication with other external networks, computing devices, and/or servers via wireless networks interfaces and/or radio components. In various examples, wireless device 110 may comprise a mobile phone, a virtual assistant device, a home automation device, a vehicle-based computing device, a tablet computer, a smart watch or other wearable computing device, an Internet-of-Things (IoT) device, or any other electronic device capable transmitting or receiving wireless data.

At operation 102, an authorized user 112 speaks a command to disable data capabilities on the wireless device 110. As shown in this example, at the time the command is spoken in operation 102 the wireless device 110 is connected to a wireless access point 114 providing access to one or more WiFi-based networks. The wireless device 110 is also within range of a cellular base station 116 providing access to a radio access network (RAN) of a mobile network 100 capable of providing data and voice services to subscribers. In this example, the user 112 speaks a voice command 118 to disable one or more data capabilities of the wireless device 110. The voice command 118 is received and processed via a microphone and audio input interface of the wireless device 110. As discussed in more detail below, the wireless device 110 may support various different types of voice commands, from a single user or multiple users, corresponding to different combinations of data capabilities to be disabled or enabled. Additionally, the wireless device 110 may analyze the audio features of voice command 118, identify the user 112 speaking the command, and verify that the user 112 is authorized to disable (or enable) the data capabilities of the wireless device 110.

At operation 104, the wireless device 110 disables certain data capabilities in response to the voice command 118 from the user 112 in operation 102. As shown in this example, the wireless device 110 has disabled its WiFi capabilities and its cellular data capabilities in response to receiving the authorized voice command 118. Accordingly, at operation 104 the wireless device 110 is configured not to support connections to the wireless access point 114 or any other WiFi connection. Additionally, the wireless device 110 at operation 104 has been configured not to send or receive data via the cellular connection with cellular base station 116 or any other base stations in the mobile network. However, as shown in this example, the wireless device 110 has been configured to enable (or retain) voice call capabilities and WEA capabilities during the same time period when the WiFi and cellular data capabilities are disabled.

Additionally, in operation 104 the wireless device 110 may disable the user interface controls within the settings menu of the wireless device 110 that correspond to the disabled data capabilities. For instance, in this example the wireless device 110 may disable a first user interface control that allows users to toggle the WiFi on or off, and a second user interface control that allows users to toggle the cellular data usage on or off for the wireless device 110.

At operation 106, the user 112 speaks a second voice command 120 to re-enable the data capabilities of the wireless device 110. Using similar or identical techniques to those in operation 102, the wireless device 110 receives and processes the second voice command 120 in operation 106, via the microphone and audio input interface of the wireless device 110. The wireless device 110 may analyze the second voice command 120 to identify the speaker and/or the spoken words or phrases of the second voice command 120. Based on the identified speaker and/or the spoken words or phrases, the wireless device 110 may determine that the second voice command 120 corresponds to a request to enable (or re-enable) certain data capabilities, and that the user 112 that spoke the second voice command 120 is authorized to enable those data capabilities. In this example, the second voice command 120 may re-enable the same data capabilities (e.g., WiFi and cellular data) that were disabled in operation 104. In various other examples, voice commands from authorized users may be used to enable or disable different combinations of data capabilities on the device. Additionally, in some cases the wireless device 110 may verify that the same user 112 that spoke the first voice command 118 to disable the data capabilities also spoke the first voice command 118 to re-enable the data capabilities, while in other examples different users may disable and re-enable the same data capabilities on the same wireless device 110.

At operation 108, the wireless device 110 re-enables the data capabilities in response to the second voice command 120 received in operation 104. As shown in this example, the wireless device 110 has re-enabled its WiFi capabilities and its cellular data capabilities in response to receiving the second authorized voice command 120. As before, the wireless device 110 also has been configured retain its voice call capabilities and WEA capabilities. Additionally, in operation 108 the wireless device 110 may re-enable the user interface controls in its settings menus corresponding to the re-enabled data capabilities. For instance, in this example the wireless device 110 may re-enable the user interface control allowing users to toggle the WiFi on or off, and the user interface control allowing users to toggle the cellular data usage on or off for the wireless device 110.

As illustrated by this example, the techniques described herein may be implemented within a wireless device 100 to allow an authorized user to disable multiple data capabilities using a single voice command. In response to the authorized voice command, the wireless device 100 disables a particular set of data capabilities to improve the network usage, device security, or parental control, while retaining other desired wireless capabilities such as voice calls, WEA capabilities, software updates, etc. Additionally, the authorized voice command may override control of the disabled data capabilities on the wireless device 100 by disabling the corresponding user interface controls in the settings menu of the wireless device 100, to prevent unauthorized users from re-enabling the data capabilities disabled by authorized users.

Figure 2:
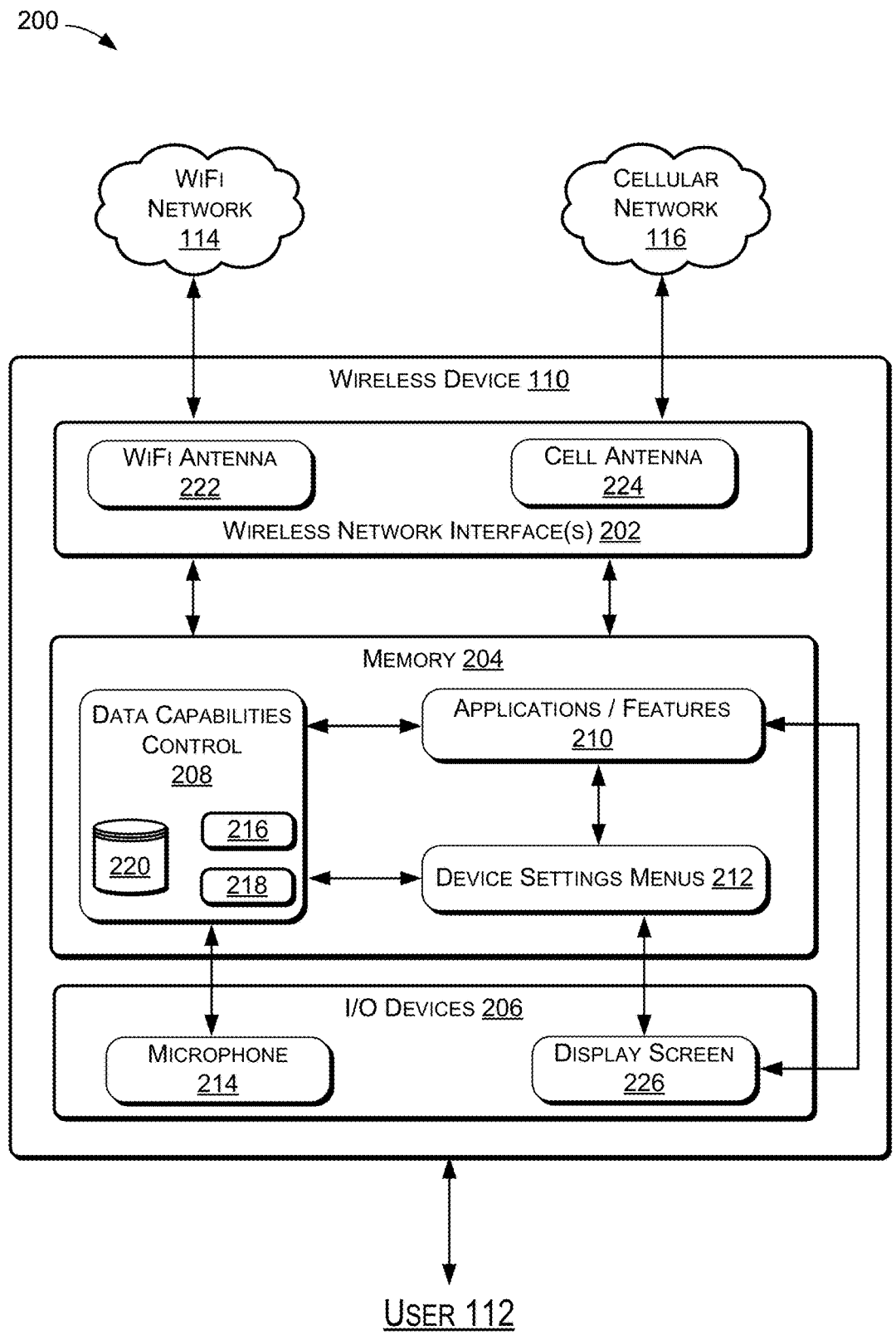
FIG. 2 illustrates a computing system with a wireless device including a voice command-based data capabilities control component, in accordance with certain techniques described herein.

FIG. 2 depicts a computing system 200 including wireless device 110 configured to support voice command-based disabling or re-enabling of data capabilities. The wireless device 110 in this example may be similar or identical to the wireless device 110 discussed above in reference to FIG. 1. In various implementations, the wireless device 110 may be a smartphone, virtual assistant device, home automation device, etc. The wireless device 110 also may include voice activation functionality in some examples.

As depicted in FIG. 1, wireless device 110 includes wireless network interface(s) 202 with one or more antennas and/or transceivers to support two-way wireless transmissions over various wireless networks, including WiFi network(s) 114 and cellular network(s) 116. Wireless device 110 also includes at least one memory 204 storing software components to perform the functionalities of the voice command-based data capability control techniques described herein. Additionally, the wireless device 110 includes I/O devices 206 for receiving inputs from and outputting data to a user 112 of the wireless device 100.

As noted above, techniques described herein include receiving voice commands from authorized users to disable and enable certain data capabilities on the wireless device, and vice versa, while leaving other network-based capabilities enabled. In this example, a data capabilities control component 208 (or data controller 208) executing in the memory 204 of the wireless device 100 may analyze voice commands and disable/re-enable various data capabilities by coordinating with the various applications and features 210 and the device settings menus 212 of the wireless device 110. The data controller 208 may receive voice commands to enable/disable data capabilities, via a microphone 214 and/or audio input interface components. The data controller 208 may process and analyze the voice command to determine which data capabilities to enable and/or disable, and to verify that the user 112 is authorized to enable or disable the particular data capabilities.

As shown in FIG. 2, the data controller 208 includes various software-based subcomponents, including a speaker recognition component 216 and a command recognition component 218, which may be implemented separately or combined. The speaker recognition component 216 and a command recognition component 218 may be speaker dependent or speaker independent components in various examples, and may or may not be trained based on the specific voice(s) of user(s) 112. In some cases, the data controller 208 may receive voice command data via the microphone 214, and may use subcomponents 216 and/or 218 to perform speech recognition techniques including data acquisition, feature extraction, feature pattern recognition, and speaker modeling. Using such techniques, the data controller 208 may compare the received voice command data with speech/voice command data stored in a voice command repository 220, in order to identify the speaker and/or determine the voice command for disabling/enabling data capabilities.

To enable and/or disable various data capabilities, the data controller 208 may transmit instructions to specific applications and/or features 210 of the wireless device 110, to configure the various applications and features to use or not use data from various wireless networks or sources as desired. In some cases, the data controller 208 may enable and/or disable data capabilities by transmitting instructions to an application management layer and/or device management layer within the architecture of the wireless device 110, instead of or in addition to communicating directing with the applications and features 210.

Additionally or alternatively, the data controller 208 may communicate directly with the wireless network interface 202 layer of the wireless device architecture to enable and/or disable various data capabilities. In this example, the wireless network interface 202 includes a WiFi antenna 222 and an internal cellular antenna 224. Although not depicted in this example, the wireless network interface 202 layer of the wireless device 110 may include additional antennas, such as a Bluetooth antenna, a GPS antenna, and/or an NFC antenna, and associated network interface components. In some examples, the wireless network interface 202 may include a primary cellular antenna and/or a separate secondary cellular antenna, along with the associated interface components. Additionally, WiFi antenna 222 may include one or more antennas for supporting 3G, 4G, LTE, and/or 5G services, which may be implemented within a single WiFi antenna 222 or within multiple antennas in any combination.

As part of the process of disabling data capabilities on the wireless device 110, the data controller 208 also may modify one or more device settings menus 212 to disable (or remove or obscure) the user interface controls within the settings menu 212 associated with the disabled data capabilities. For instance, the data controller 208 may transmit instructions to the device settings menus 212 to disable the particular user interface controls that allow users to enable WiFi, cellular data, and/or any other disabled data capabilities. When a user interface control has been disabled, the settings menu 212 may freeze and render the control as grayed-out, or remove the control from the user interface, so that any user 112 of the wireless device may be unable to view and/or manipulate the user control via the display screen 226 (e.g., touch screen) to re-enable the data capabilities. Therefore, by disabling the user interface controls for the associated data capabilities, the data controller 208 may prevent unauthorized users from using the display screen 226 to re-enable the data capabilities that were disabled via the authorized voice command.

Although the data controller 208 depicted as a standalone software component, in some implementations the data controller 208 may be implemented within (or associated with) a preexisting software architecture for voice activation and control of the wireless device 110. For instance, a general-purpose voice activation and control component (not shown) may receive, analyze, and authorize voice commands received via the microphone 214, and may direct any of the voice commands related to disabling/enabling data capabilities to the data controller 208, while other voice commands are directed to separate components.

Figure 3:
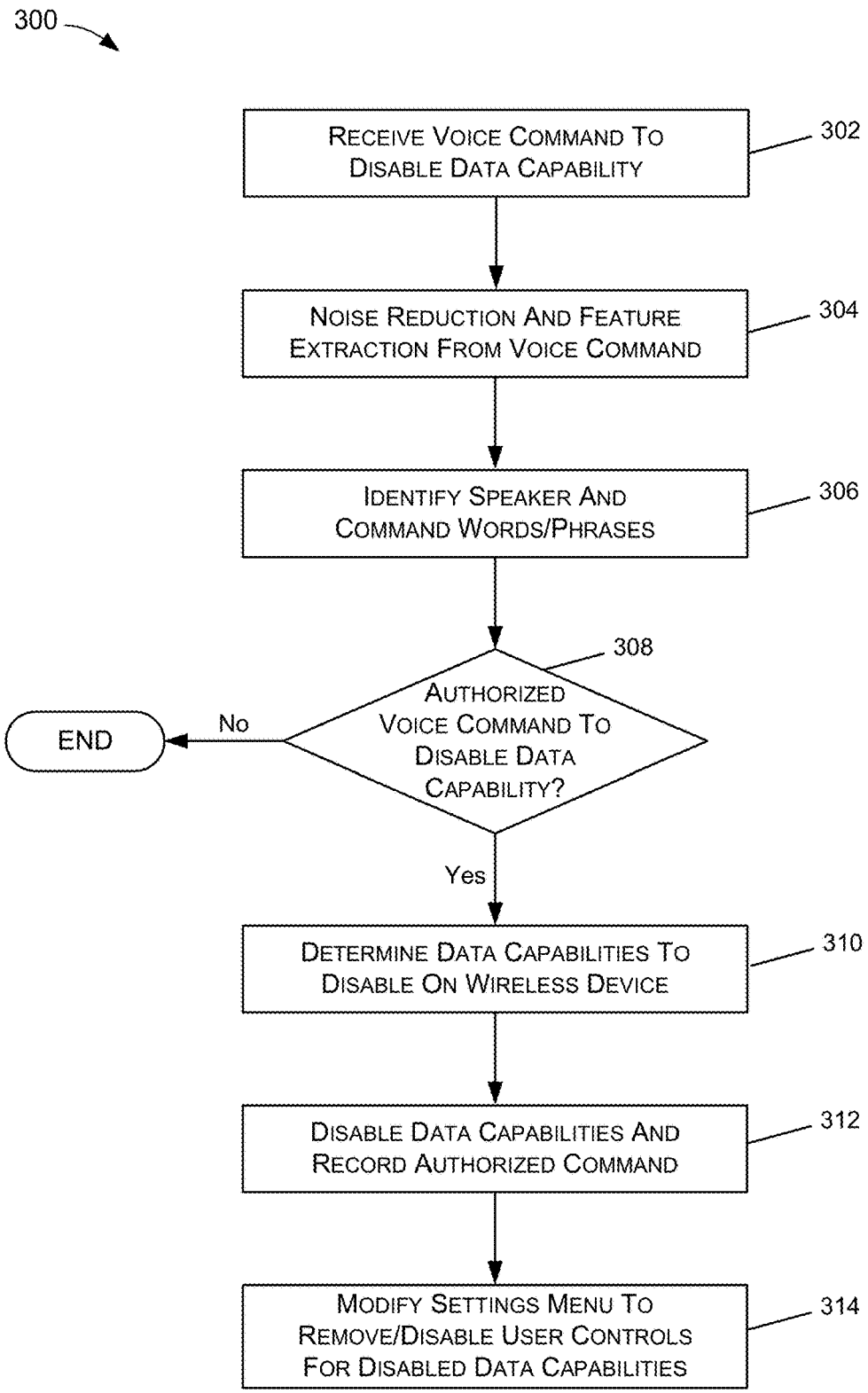
FIG. 3 is a flow diagram illustrating a process for disabling one or more data capabilities based on a voice command received at a wireless device, in accordance with certain techniques described herein.

FIG. 3 is a flow diagram illustrating an example process 300 of disabling one or more data capabilities on a wireless device, based on an authorized voice command received at the wireless device. As described below, the operations described in connection with process 300 may be performed by a wireless device 110 including an audio source input (e.g., microphone 214), and which is configured to receive and transmit wireless data via one or more wireless network components (e.g., WiFi antenna 222 and internal cellular antenna 224). As described in this example, the operations of process 300 may be performed by a software-based data controller 208 executing within the memory 204 of the wireless device 110, in conjunction with one or more application/features 210, and the device settings menus 212 of the wireless device. In other examples, the operations described in process 300 may be performed within individual network interfaces and/or mobile applications executing on the wireless device 110, and/or other combinations of computing devices and components described herein.

At operation 302, the data controller 208 receives a voice command to disable one or more data capabilities on the wireless device 110. The voice command may be received via the microphone 214 and/or any other audio inputs to the wireless device 110, including from the user 112 in an immediate proximity of the wireless device 110 or from a remote user (e.g., via a phone or video connection). As discussed in more detail below, the voice commands received in operation 302 may correspond to one or more of various different types, formats, and patterns of voice commands to disable data capabilities on the wireless device 110. In some examples, the voice command may be limited to a single word or a few short words (e.g., "Disable," "Disable Data," "Disable All Data," etc.), which may represent a request to disable all of the data capabilities or a predetermined default set of data capabilities on the wireless device 110.

In other examples, the voice command received at operation 302 may specify additional data relating to the disable data request. For instance, the voice command may identify individual features or applications on the wireless device 100 to which the disable data request applies. As an example, a voice command may request that data capabilities be disabled on the wireless device for any specific mobile application(s) or other device features, (e.g., "Disable data for 'YOUTUBE®,' 'NETFLIX®,' 'WHATSAPP®,' 'FACEBOOK®,' or 'GOOGLE MAPS®,' etc."), or may include a general description of the applications and/or features for which data is to be disabled (e.g., "Disable data for 'all video streaming apps,' 'all gaming apps,' 'social media,' 'email and messaging features,' 'web browsing,' etc."). In some cases, the voice command received at operation 302 also may include an indication of the time or duration for which the data capabilities are to be disabled on the wireless device 100. For instance, a voice command may request that one or more data capabilities be disabled for "X minutes," "Y hours," or "Z days," etc. The voice command also may specify that the data capabilities be disabled until a particular event occurs (e.g., "the end of the day," "school is over," "we get back home," etc.), the occurrence of which may be monitored and verified by the wireless device 110 using various sensors (e.g., clock, GPS, access to various application data, etc.).

In some examples, the voice command received in operation 302 may include authorization-related data, such as the user's password, passcode, or a key phrase that the data controller 208 may verify to determine that the voice command is a valid and authentic command from an authorized user. Additionally or alternatively, the voice command may specify one or more other users that are authorized to re-enable the data capabilities that are being disabled with the current voice command. For instance, the voice command may indicate that the disabled data capabilities can be re-enabled only by that same user, or may specify one or more other users (e.g., "me or Bill," "your parents or teacher," "a senior manager," etc.) that are authorized to re-enable the data capabilities on the wireless device 110.

At operation 304, the data controller 208 may process the voice command received at operation 302 using various speech recognition and/or speaker recognition techniques. In some cases, such techniques may be implemented within the speaker recognition component 216 and/or the command recognition component 218. Such techniques may be optional in some examples, although as shown in this example the data controller 208 may execute a noise reduction process and a feature extraction process at operation 304, to convert the voice command into a format where it can be analyzed and compared to voice command data (e.g., voice templates) in the voice command repository 220. In various implementations, the data controller 208 may perform one or more noise reduction techniques, including but not limited to Kalman filtering, adaptive Wiener filtering, spectral subtraction, blind equalization, Cepstral mean subtraction, and/or adaptive LMS filtering. The data controller 208 also may perform one or more feature extraction techniques in order to identify observable and discriminative features within the acoustic data of the voice command. The feature extraction process may output a set of feature vectors using various techniques such as Mel-frequency Cepstral Coefficients (MFCC), Perception Linear Prediction (PLP), Linear Prediction Coefficient (LPC), Linear Discriminant Analysis (LDA), Dynamic Time Warping (DTW), and Wavelet.

At operation 306, the data controller 208 may identify the speaker and/or the specific words or phrases of the voice command received at operation 302. In some examples, the data controller 208 may perform voice recognition techniques to convert the spoken voice commands into text. The text of the voice command may be parsed and analyzed to determine the scope and specifics of the request to disable the data capabilities on the wireless device 110. As discussed above, the text of the voice command may include an instruction to disable data capabilities on the wireless device 110, an enumeration of specific device features and/or applications for which data is to be disabled, an indication of the type(s) of data service to be disabled (e.g., WiFi, cellular data, Bluetooth, etc.), a time frame or time window for disabling the data capabilities, authorization data, etc.

In some examples, operation 306 also may include speaker recognition techniques performed by the data controller 208 to determine whether the voice command received at operation 302 was spoken by a known and authorized user (e.g., user 112) of the wireless device 110. For instance, a speaker recognition component 216 may determine the speech and/or voice characteristics based on the voice command, including spectral measurements, vocal tract characteristics, voice source characteristics, etc. To identify and/or verify the speaker of the voice command, the speaker recognition component 216 may analyzed and compare one or more utterances from the voice command with previously stored speech models for known and authorized speakers associated with the wireless device 110. Speech models for known authorized speakers may be stored in the voice command repository 220 and/or in a separate repository external to the wireless device 100. If the characteristics of previously stored speech model associated with a user 112 sufficiently match the speech characteristics of the utterances analyzed within the voice command (e.g., greater than a speech characteristic matching threshold), the data controller 208 may determine that that user 112 is the speaker of the voice command. In contrast, if the speech characteristics of the voice command do not match (e.g., less than a speech matching threshold) an existing speech model for any known user of the wireless device 110, the data controller 208 may determine that the voice command is associated with an unknown speaker.

In the examples above, the data controller 208 may analyze the voice command to determine both the spoken words within the voice command, and the speaker of the voice command. In these examples, the data controller 208 may use the identity of the speaker to retrieve the speaker's credentials on the wireless device 110, and to determine whether or not the speaker is authorized to disable the data capabilities requested by the voice command.

However, in other examples the data controller 208 may be configured not to identify the speaker of the voice command, or may attempt to but is unable to successfully identify the speaker. In such examples, the data controller 208 may use various other techniques to determine the identity of the speaker and verify that the speaker is authorized to disable the data capabilities of the wireless device 110. For instance, the voice command received in operation 302 may include a spoken authorization code (e.g., passcode, password, key phrase, etc.). In such cases, the data controller 208 may detect and recognize the spoken authorization code using speech recognitions techniques, and compare the authorization code to a secure (e.g., encrypted) library of authorization codes in the voice command repository 220 or other memory of the wireless device 110, to determine whether or not the voice command is from an authorized user 112. Additionally or alternatively, the data controller 208 may perform one or more other user authorization techniques using the features of the wireless device 110, such as a password or passcode entered via a touchscreen or keypad, fingerprint verification, retina or iris scanning, facial recognition, etc., to identify and verify the user 112 associated with the voice command.

At operation 308, the data controller 208 determines whether or not the voice command received at operation 302 is an authorized voice command to disable data capabilities. As noted above, the speaker/user associated with the voice command, and well as the text/characteristics of the request within the voice command may be determined at operation 304. In some examples, the data controller 208 may access permissions data within the voice command repository 220 or other memory to determine whether the speaker/user identified in operation 306 is authorized to disable the requested data capabilities. For instance, the voice command repository 220 (or separate secure memory) may store permissions data that associates different users 112 with different levels of control to disable/enable the data capabilities on the wireless device 110. In some cases, certain device users 112 (e.g., a device owner or primary user, administrator, parent, supervisor, etc.) may be authorized to disable/enable any and all data capabilities on the wireless device 110 at any time, while other device users are not authorized. In other examples, the data controller 208 may implement more granular control over the disabling and enabling of data capabilities, in which certain users 112 may be authorized to disable and/or enable specific data capabilities (e.g., particular wireless protocols/networks, particular applications/features, at particular locations, during particular time windows, etc.).

For instance, referring briefly to FIG. 4, a table 400 is shown including example user authorization data for voice commands for disabling and enabling data capabilities on a wireless device 100. The data depicted in example table 400 may represent user permissions/credentials that may be stored within the voice command repository 220 or elsewhere on the wireless device 100, and used by the data controller 208 in operation 308 to determine whether or not a voice command to disable data capabilities is authorized.

In this example, table 400 is organized so manner that each row corresponds to a different voice command from an authorized user to enable or disable data capabilities on the wireless device 110. For each authorized voice command, table 400 includes a user 402, an authorization command 404, the command type 406 (e.g., disable or enable data capabilities), the wireless data type(s) 408 (e.g., wireless antennas, networks, and/or protocols to be enabled or disabled, the applications/features 410 (e.g., data defining a set of applications and/or features on the wireless device 110 for which data capabilities are to be enabled or disabled), and whether the command requires a secondary authorization command from the user 412 (e.g., a passcode, biometric verification, etc.). In this example, parentheticals within the applications/features column 410 may indicate exceptions to the data capabilities indicated outside of the parenthesis. For instance, the data disable command for User 2 in this example may represent a command to disable all WiFi and cellular data capabilities on the wireless device 110, except when using the map feature and for performing operating system updates on the device.

As noted above, each row table 400 may correspond to a different voice command from an authorized user to enable or disable data capabilities. Accordingly, as this example illustrates, a single user may have different predefined voice commands for enabling and/or disabling different data capabilities (e.g., different combinations of applications and features, different wireless data types, etc.). Although not shown in this example, different voice commands also may be associated with different time windows and/or different locations of the wireless device 110. As shown in table 400, different voice commands associated with the same user may have different authorization codes (e.g., passwords, passcodes, key phrases, etc.), and may have different requirements for a secondary authorization.

It should be understood that the structure and organization of voice command authorization data in table 400 is illustrative, and that other data structures, data relationships, and data organizations may be used in other implementations. In some examples, the data controller 208 may maintain authorization data that includes a user identifier field and an authorization command field, potentially without any other data fields shown in table 400 or described above. In such examples, the verification of an authorized user may be sufficient to permit the user to enable or disable any and all data capabilities on the device. An authorization command field 404 also may be optional in some cases, for instance, when the data controller 208 uses speaker recognition techniques rather than a password, key phrase, etc., to verify the identity of authorized user 112.

Returning to FIG. 3, when the data controller 208 determines at operation 308 that the speaker and/or current user 112 is not authorized to disable the requested data capabilities (308:No), process 300 may be terminated and no data capabilities are disabled on the wireless device 110. In some examples, the data controller 208 may initiate a voice response, notification, or visual user interface to request additional authorization from the current user (e.g., a password or key phrase) or to indicate that a different user 112 is required to authorize the disabling of the data capabilities. In contrast, when the data controller 208 determines at operation 308 that the speaker and/or current user 112 is authorized to disable the requested data capabilities (308:Yes), process 300 may proceed to operation 310 in which the data controller 208 disables the requested data capabilities on the wireless device 110.

At operation 310, after determining that the voice command received at operation 302 is an authorized command to disable data capabilities on the wireless device 110, the data controller 208 disables the one or more data capabilities associated with the voice command. In order to disable the data capabilities, the data controller 208 may invoke one or more APIs and/or other internal functions on the wireless device 110, including functions of an application management interface, device management interface, and/or network management interface. As noted above, the functionality for disabling and enabling various data capabilities may be different on different wireless devices 110 depending on the device types, current operating system version, peripheral devices, and the various applications and/or features installed on the device. Accordingly, the programmatic functionality within the data controller 208 for enabling and disabling various data capabilities may depend on the type, operating system, features, and applications of the wireless device 110. In some instances, the data controller 208 may invoke an API associated with the wireless network interface 202 to disable data capabilities for a specific antenna, wireless network and/or protocol. Additionally or alternatively, the data controller 208 may invoke an API associated with management and usage of the applications and features installed on the wireless device 110, to disable the appropriate data capabilities for the specified applications and features.

Additionally, operation 310 may include multiple different API invocations, function calls, or operations, to disable multiple different types of data capabilities in response to a single voice command. As an example, the wireless device 110 may support one interface or library to enable/disable mobile operation system software updates from occurring on the device, and a separate interface or library to enable/disable cellular data for specific applications installed on the device, and in operation 310 the data controller 208 may invoke both of the separate interfaces/libraries to disable both data capabilities on the wireless device 110.

Figure 5:
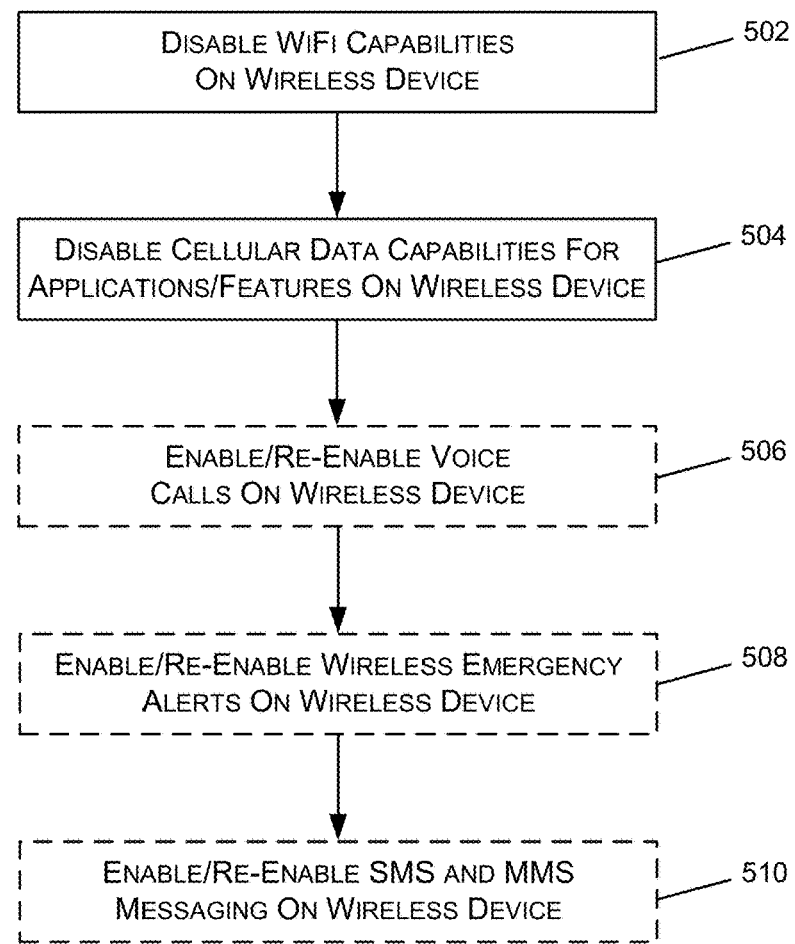
FIG. 5 is a flow diagram illustrating a process for disabling certain data capabilities and enabling additional data and/or network capabilities on a wireless device, in accordance with certain techniques described herein.

Referring briefly to FIG. 5, another flow diagram is shown illustrating a process 500 for disabling a set of data capabilities, and enabling an additional set of data and/or network capabilities, in response to an authorized voice command. Process 500 represents an example set of operations that the data controller 208 may perform during operation 310, in response an authorized voice command to disable data on the wireless device 110. In this example, at operation 502 the data controller 208 invokes one or more internal interfaces or functions to disable WiFi capabilities on the wireless device 110. At operation 504, the data controller 208 invokes one or more additional internal interfaces or functions to disable cellular data capabilities on the wireless device 110. As noted above, the interfaces or functions invoked on the wireless device 110 in operations 502 and 504 may be device specific, operating system specific, and application specific.

In some examples, operation 310 may include a sequence of operations performed by the data controller 208, including a first operation that disables a group of data capabilities followed by a second operation that re-enables a subset of the capabilities in the group. For instance, in example process 500, the data controller 208 may perform (optional) operations 506-510 to re-enable or confirm additional data-related and/or network-related capabilities, to ensure that the wireless device 110 retains a desired set of data and network capabilities at the same time that other data capabilities are disabled. In this example, process 500 is designed and executed by the data controller 208 to ensure that the WiFi capabilities and cellular data capabilities are disabled (operations 502-504) while that certain additional capabilities remain available on the wireless device 110 (operations 506-510). At operation 506, the data controller 208 invokes one or more internal interfaces or functions to enable (or re-enable, confirm operation of, etc.) the voice call capabilities on the wireless device 110. At operation 508, the data controller 208 invokes one or more internal interfaces or functions to enable WEA alerts on the wireless device 110. At operation 510, the data controller 208 invokes one or more internal interfaces or functions to enable SMS and MMS messaging capabilities on the wireless device 110. Thus, in this example, the data controller 208 performs operations 502 and 504 to disable all WiFi and cellular data capabilities, and then performed operations 506-510 to re-enable and/or confirm operation of voice call capabilities (e.g., including both cellular and WiFi-based voice calls), WEA alerts, and SMS/MMS messaging. Like operations 502-504, operations 506-510 also may be performed by the data controller 208 by invoking internal interfaces and/or functions on the wireless device 110, to enable and/or verify availability of the desired data capabilities.

As noted above, operations 506-510 may be unnecessary and/or may be optional performed in some implementations. For instance, in some cases the data controller 208 may determine that disabling a desired set of data capabilities does not disable or otherwise affect any other data capabilities on the wireless device 110. In this example, if the operations performed to disable WiFi and cellular data capabilities do not also disable voice call capabilities, WEA alerts, and SMS/MMS messaging, then operations 506-510 may be unnecessary. However, if the data controller 208 determines that performing the operations to disable the desired set of data capabilities for the voice command also disables additional data capabilities that should not to be disabled, the data controller 208 may determine and perform additional operations to re-enable or confirm that the additional data capabilities are enabled. For instance, if a voice command from an authorized user corresponds to a request to disable cellular data for all applications/features on the wireless device 110, except for a certain enumerated applications/features, the data controller 208 in operation 310 may perform a first operation to disable all cellular data capabilities on the wireless device 110, and then subsequent operations to re-enable cellular data for the enumerated applications/features. In some cases, such techniques may be more computationally efficient and may provide greater accuracy and granularity then performing separate operations to disable each individual application/feature on the wireless device 110.

As illustrated by this example, in operation 310 the data controller 208 may perform multiple operations to disable multiple different data capabilities on the wireless device 110 in response to a single voice command spoken by an authorized user 112. Additionally, as this example shows, in operation 310 the data controller 208 also may be configured to re-enable, retain, and/or confirm availability of other data capabilities on the wireless device 110 as necessary, at the same time when the desired data capabilities are disabled. These techniques thus provide a more efficient and reliable interface for an authorized user 112 to disable a specific sets of data capabilities on the wireless device 110, while retaining other data capabilities, in which the user can initiate a complex sequence of operations to disable/enable data capabilities with a single voice command, and need not navigate any of the settings menus on the wireless device 110 to configure the data capabilities. Additionally, although the operations in process 500 describe a specific example of disabling WiFi and cellular data while retaining voice call capabilities, WEA alerts, and SMS/MMS messaging, it should be understood that in other examples operation 310 may disable any desired set of data capabilities on the wireless device 110 while enabling or retaining other data capabilities.

Continuing with operation 310, in addition to the data controller 208 disabling and/or enabling determined sets of data capabilities, the data controller 208 also may log or otherwise record data associated with the authorized voice command. For example, the data controller 208 may store log data in the voice command repository 220, or elsewhere within the memory 204 of the wireless device 110 or within an external memory, indicating the voice command received at operation 302, the speaker/user 112 associated with the voice command, the time associated with the voice command, the location of the wireless device 110 at when the voice command was received, etc. The data controller 208 also may log or otherwise record the data capabilities that were disabled (and/or enabled) in operation 310.

As described in more detail below, the data controller 208 may enforce requirements for particular users 112 and/or particular voice commands to disable data, that specify which users can re-enable the data capabilities disabled by the particular users and voice commands. To illustrate, in some cases a user 112 may be authorized to enable or disable data capabilities on the wireless device 110 at all times and in all circumstances. In other cases, when a first authorized user 112 disables data capabilities on the wireless device 100, those the data capabilities may be re-enabled only by the first authorized user 112 and/or by other associated users that have been expressly granted permissions to re-enable the data capabilities disabled by the first authorized user 112. For instance, in a parental control context, a parent may disable data capabilities using a voice command that only he/she can re-enable. In another example, the parent may use a different voice command (e.g., specifying one or more other authorized users) that disables data capabilities while authorizing one or more other users (e.g., other parents, teachers, etc.) to re-enable the data capabilities. Associations between different authorized users 112 to disable and enable data capabilities on the wireless device 110 may be defined at the user-level or may be voice command-specific, and also may include time-based and location-based criteria. Accordingly, by logging or otherwise recording data in operation 310 associated with the authorized user and the voice command, the data controller 208 may use the data in subsequent operations to determine whether a command to re-enable data capabilities is authorized.

At operation 312, the data controller 208 may modify the device settings menus 212 of the wireless device 110 to remove and/or disable the user controls within the settings menus associated with any data capabilities disabled in operation 310. For example, for each data capability disabled in operation 310, the data controller 208 may invoke an internal interface or function provided by the device settings menus 212 to disable (e.g., gray out) or remove the corresponding user interface control within the device settings menus 212. For instance, if operation 310 included disabling the WiFi and cellular data for "Application 1," then in operation 312 the data controller 208 may invoke an internal interface or function to disable the user interface control that allows device users to toggle (e.g., enable and disable) WiFi and cellular data usage for Application 1. Removing and/or disabling the user controls in operation 312 may include determining and invoking the interfaces or functions that correspond to data capabilities disabled in operation 310. In various examples, the interfaces or functions may include application-specific settings menus, and/or device-level data usage menus, network settings menus, etc. As noted above, by removing or disabling the associated user controls with the device settings menus 212, the data controller 208 may effectively override the user interface-based settings menus to prevent unauthorized users from re-enabling the data capabilities that were disabled via a voice command by an unauthorized user.

Figure 6A:
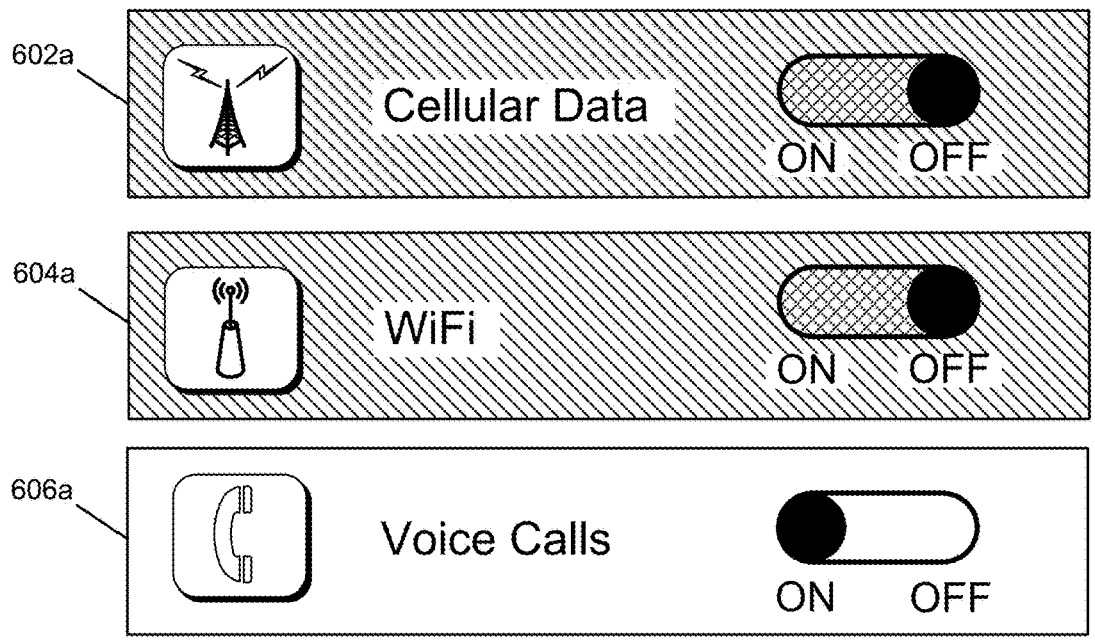
FIGS. 6A and 6B illustrate user interface controls within one or more various settings menus associated with the data capabilities on a wireless device, in accordance with certain techniques described herein.
Figure 6B:
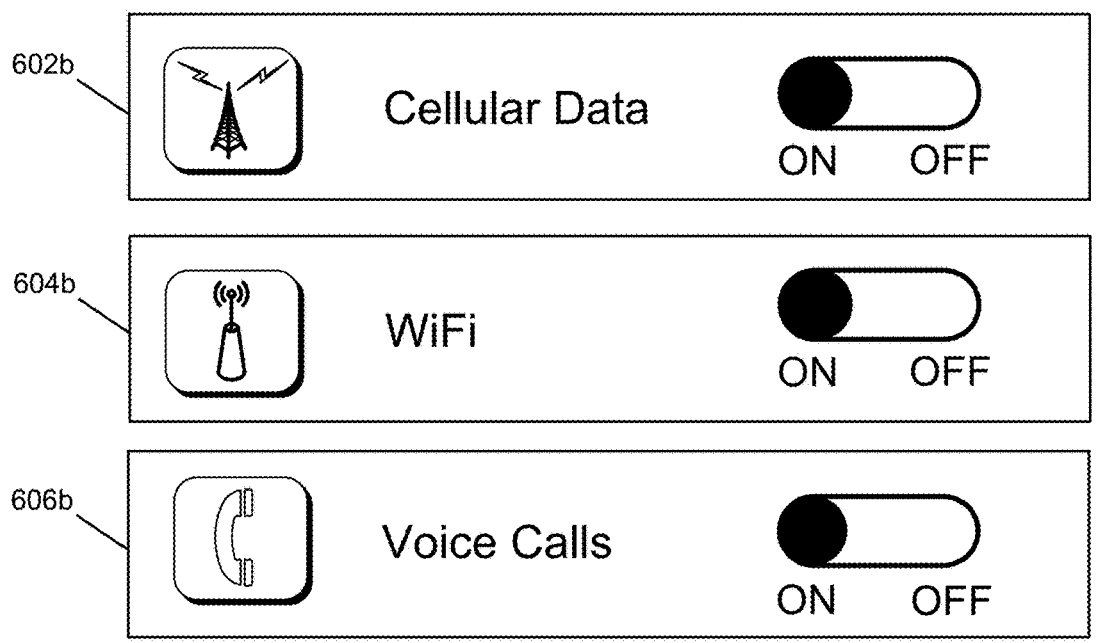

Referring briefly to FIGS. 6A and 6B, three examples are shown of user interface controls 602-606 associated with different data capabilities that may be enabled or disabled on the wireless device 110. In this example, a first control 602 within a settings menu of the wireless device 110 allows users to enable or disable cellular data capabilities on the wireless device 110. A second control 604, which may be within the same settings menu or a different settings menu, allows users to enable or disable the WiFi capabilities on the wireless device 110. A third control 606, which may be within the same settings menu(s) as controls 602 and/or 604 or a different settings menu, allows users to enable or disable the voice call capabilities on the wireless device 110. In some examples, the control 606 may be implemented as two separate controls within the settings menu of the wireless device 110, a control for cellular voice calls and a separate control for WiFi voice calls.

FIG. 6A may represent a state of the settings menus of the wireless device 110 after certain data capabilities have been disabled in operation 312. In this example, the data controller 208 has disabled the user control 602*a* associated with cellular data capabilities, has disabled the user control 604*a* associated with WiFi capabilities, and has enabled (or activated) the user control 606*a* associated with voice call capabilities. In contrast, FIG. 6B may represent the state of the settings menus of the wireless device 110 after the data capabilities have been re-enabled. In this example, the data controller 208 has re-enabled the user control 602*b* associated with cellular data capabilities, has re-enabled the user control 604*b* associated with WiFi capabilities, and has kept enabled (or confirmed activation of) the user control 606*b* associated with voice call capabilities.

As shown in FIGS. 6A and 6B, the data controller 208 may modify the settings menus 212 of the wireless device 110 to deactivate and gray-out the user controls 602*a* and 604*a* in response to a voice command disabling the corresponding data capabilities, and may reactivate the user controls 602*b* and 604*b* in response to a second voice command re-enabling these data capabilities. In various examples the data controller 208 may deactivate and gray-out the appropriate user controls, or may remove the user controls altogether from the settings menus 212 of the wireless device 110. Additionally or alternatively, the data controller 208 may modify the settings menus 212 to add a notification indicating to users that the corresponding data capabilities have been disabled and/or indicating which user(s) are authorized to re-enable the data capabilities.

Although user controls 602-606 are depicted together in FIGS. 6A and 6B, it should be understood that these different user controls may be implemented at different locations and/or different menus within the device settings menus 212 (e.g., application-specific settings menus, network settings menus, data usage settings menus, etc.). Additionally, although three user controls are shown in this example, relating to WiFi, cellular data, and voice call capabilities, it should be understood that the user controls modified in operation 312 may include greater or fewer user controls and may relate to any data capabilities described herein (e.g., Bluetooth capabilities, NFC capabilities, application-specific or feature-specific data capabilities, etc.).

Figure 7:
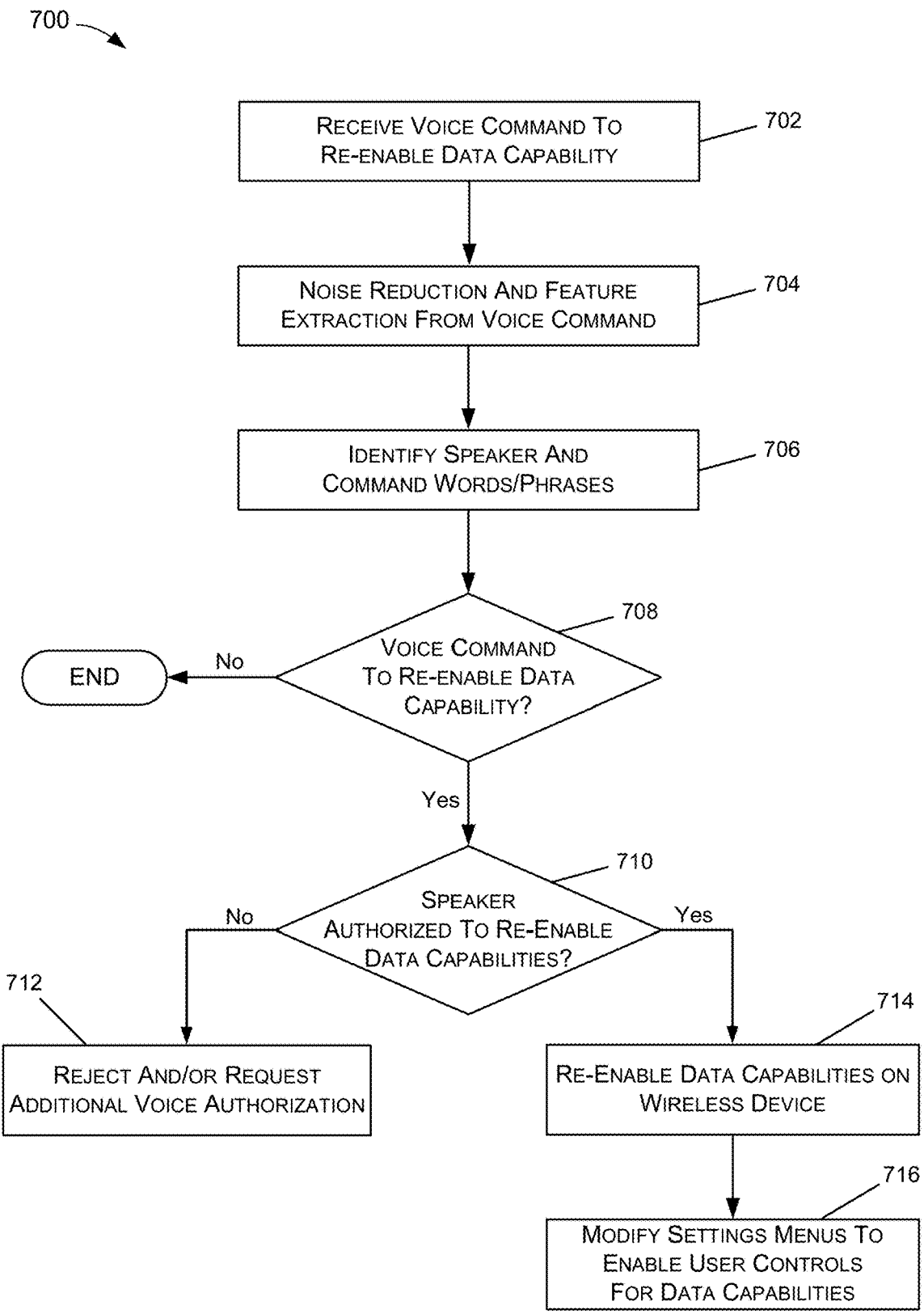
FIG. 7 is a flow diagram illustrating a process for re-enabling data capabilities based on a voice command received at a wireless device, in accordance with certain techniques described herein.

FIG. 7 is a flow diagram illustrating an example process 700 of re-enabling one or more data capabilities on a wireless device, based on an authorized voice command received at the wireless device. In some examples, process 700 may be related to process 300, and the operations of process 700 described below may be performed to re-enable the data capabilities disabled in process 300. Accordingly, the techniques performed during the operations of process 700 may be similar or identical to the techniques described above in reference to process 300. In some cases, process 700 may be performed by a data controller 208 executing within a wireless device 110, in response to a voice command received via an audio source input (e.g., microphone 214). In other examples, the operations described in process 700 may be performed within individual network interfaces and/or mobile applications executing on the wireless device 110, and/or other combinations of computing devices and components described herein.

Although process 700 describes an example in which voice commands are used to enable or re-enable data capabilities on the wireless device 110, in other examples other techniques may be used for enabling or re-enabling data capabilities. In some cases, if a voice command from an authorized user (e.g., a parent or employer) was previously used to disable data capabilities on the wireless device 110, then the credentials of that authorized user cannot be used to re-enable the data capabilities via the settings menu of the touch screen user interface. However, if the wireless device 110 is accessed using additional administrator credentials (e.g., an administrator passcode), then the disabled data capabilities may be re-enabled via the settings menu. Such features may provide advantages by allowing an administrator or other superseding user to re-enable data capabilities previously disabled via a voice commend from a different authorized user, or in instances when the authorized user loses his/her voice, for microphone failures on the wireless device 110, etc.

At operation 702, the data controller 208 receives a voice command to enable (or re-enable) one or more data capabilities on the wireless device 110. In some examples, operation 702 may be similar or identical to operation 302 discussed above. However, in operation 702 the voice command received via the microphone 214 (and/or any other audio inputs) may correspond to a command to enable (e.g., "Enable . . . ," "Enable Data," "Enable All Data," etc.) rather than to disable data capabilities on the wireless device 110. In some cases, voice command received at operation 702 also may specify the type(s) of data to be enabled (e.g., wireless network types, protocols, antennas, etc.), the individual features or applications on the wireless device 100 to which the enable data request applies, and/or the times, locations, or users associated with the enable data request, etc. As discussed above for operation 302, the voice command received in operation 302 also may include authorization-related data, such as the user's password, passcode, or a key phrase that the data controller 208 may verify to determine that the voice command is a valid and authentic command from an authorized user.

At operation 704, the data controller 208 may process the voice command received at operation 702 using various speech recognition and/or speaker recognition techniques. Operation 704 may be similar or identical to operation 304 in some examples. As discussed above in reference to operation 304, the data controller 208 may implement various speech recognition techniques in operation 704 via the speaker recognition component 216 and/or the command recognition component 218, including noise reduction and feature extraction processes to convert the voice command into a format where it can be analyzed and compared to voice command data (e.g., voice templates) in the voice command repository 220.

At operation 706, the data controller 208 may identify the speaker and/or the specific words or phrases of the voice command received at operation 702. Operation 706 may be similar or identical to operation 306 in some examples. As discussed above, the text of the voice command received in operation 702 may be parsed and analyzed to determine the scope and specifics of the request to enable the data capabilities on the wireless device 110. The text of the voice command may include an instruction to enable (or re-enable) data capabilities on the wireless device 110, an enumeration of specific device features and/or applications for which data is to be re-enabled, an indication of the type(s) of data service to be enabled (e.g., WiFi, cellular data, Bluetooth, etc.), a time frame or time window for enabling the data capabilities, authorization data, etc. In some examples, operation 706 may include similar or identical speaker recognition techniques to those discussed above, performed by the data controller 208 to determine whether the voice command received at operation 702 was spoken by a known and authorized user 112.

At operation 708, the data controller 208 determines whether or not the voice command received at operation 702 corresponds to a request to re-enable one or more disabled data capabilities that were previously disabled on the wireless device 100. In some examples, operation 708 may include similar or identical techniques to those described above for operation 308. Initially, the data controller 208 may parse and analyze the text of the voice command identified in operation 706, to determine if the voice command is a request to enable one or more data capabilities on the wireless device 110. If the voice command received at operation 702 does not correspond to an enable data command (708:No), then process 700 may be terminated and no data capabilities are enabled (or re-enabled) on the wireless device 110.

If the voice command received at operation 702 corresponds to an enable data command, then the data controller 208 may determine if the data capabilities requested to be enabled are currently disabled on the wireless device 110. For instance, the data controller 208 may invoke internal interfaces/functions within the device applications/features 210, the device settings menus 212, and/or other internal network, device, and/or data management features of the wireless device 110, to determine the current enabled/disabled status of the requested data capabilities. Additionally or alternatively, the data controller 208 may retrieve data from the voice command repository 220 or other device storage including records of previous data disable voice commands, to determine whether the data capabilities are current enabled or disabled on the wireless device 110. If the voice command received at operation 702 is a request to enable data capabilities that are already enabled, then there are no data capabilities to be re-enabled on the wireless device 110 (708:No), and process 700 may be terminated. However, if the voice command received at operation 702 corresponds to a request to enable data capabilities on the wireless device 110, and if the data controller 208 determines that those data capabilities are currently disabled (708:Yes), then process 700 may proceed to operation 710.

At operation 710, the data controller 208 determines whether or not the speaker/user 112 associated with the voice command is authorized to re-enable the requested data capabilities. As noted above, the data controller 208 may be configured to ensure that when an authorized user 112 (e.g., a parent, teacher, supervisor, etc.) disables certain data capabilities on the wireless device 110, the data capabilities cannot be re-enabled by an unauthorized user (e.g., a child, student, employee, etc.) who is subsequently in possession of the device. Accordingly, at operation 710, the data controller 208 may compare the speaker identified in operation 706 to a predetermined listing of speakers authorized to re-enable the requested data capabilities.

In various examples, the authorization processes of operation 710 may be similar or identical to those described above operation 308. As discussed above, the data controller 208 may access permissions data within the voice command repository 220 or other memory to determine whether the speaker/user identified in operation 706 is authorized to re-enable the requested data capabilities. The speaker/user 112 associated with the voice command may be identified based on speaker recognition techniques, and/or based on an authorization code (e.g., types or spoken password, passcode, or key phrase), biometric inputs, and/or other authorization techniques. In some implementations, device owners, administrators, and/or other authorized users 112 may have permissions to enable (or re-enable) all data capabilities on the wireless device 110 at any time, while other device users are not authorized to enable or re-enable any data capabilities via voice commands. In other examples, the data controller 208 may implement more granular control over the re-enabling data capabilities, in which certain users 112 may be authorized to re-enable specific data capabilities (e.g., particular wireless protocols/networks, particular applications/features, at particular locations, during particular time windows, etc.). In some examples, the re-enabling permissions for data capabilities may be voice command-specific, in which certain disable data commands are associated with specific, and/or may include time-based and location-based criteria for re-enabling data capabilities. In such cases, the data controller 208 may retrieve log data or data of records for the previous disable data commands, and may use determine which users are authorized to re-enable the data based on the previous disable data commands.

If the speaker/user 112 associated with the voice command received in operation 702 is not authorized to re-enable the requested data capabilities (710:No), then at operation 712 the data controller 208 may reject and/or request additional authorization before re-enabling the data capabilities requested in the voice command. In some examples, the data controller 208 may output a spoken response and/or a notification via the display screen 226, which may request a voice template (or voiceprint) authorization, biometric authorization, or a password or other authorization code before re-enabling the data capabilities. Additionally or alternatively, the data controller 208 may output the names of the user(s) that are authorized to re-enable the requested data capabilities, which may correspond to the user 112 that disabled the data capabilities via a previous voice command, and/or other authorized users designated to re-enable the data capabilities.

If the speaker/user 112 associated with the voice command received in operation 702 is authorized to re-enable the requested data capabilities (710:Yes), then at operation 714 the data controller 208 may re-enable the data capabilities requested in the voice command. In some examples, operation 714 may include similar or identical techniques for re-enabling data capabilities as those described above for disabling data capabilities in operation 310. For instance, the data controller 208 may invoke one or more APIs and/or other internal functions on the wireless device 110 to re-enable the requested data capabilities. Such API or internal functions may be associated with the wireless network management interface, an application management interface, a data management interface, and/or specific device features or applications installed on the device, based on the internal architecture of the wireless device 110.

At operation 716, the data controller 208 may modify the device settings menus 212 of the wireless device 110 to replace and/or enable the user controls within the settings menus associated with any data capabilities re-enabled in operation 714. In some examples, operation 716 may include similar or identical techniques for enabling user controls as those described above for disabling user controls in operation 312. For example, for each data capability re-enabled in operation 714, the data controller 208 may invoke an internal interface or function provided by the device settings menus 212 to enable or activate the corresponding user interface control within the device settings menus 212. In various examples, data controller 208 may invoke various interfaces or functions of application-specific settings menus, and/or device-level data usage menus, network settings menus, etc.

Although the above examples describe techniques for using authorized voice commands to disable and enable data capabilities on wireless device, similar or identical techniques may be used in other examples for gesture-based disabling and enabling of data capabilities. For instance, any or all of the above techniques involving voice commands from authorized users may be performed similarly or identically based on facial recognition and/or gestures from authorized users. Such gestures may be detected via the internal cameras, infrared sensors, and/or other input sensors on the wireless device 110, and specific gestures from authorized users may be associated with commands to disable and/or re-enable particular sets of data capabilities on the wireless device 110.

Figure 8:
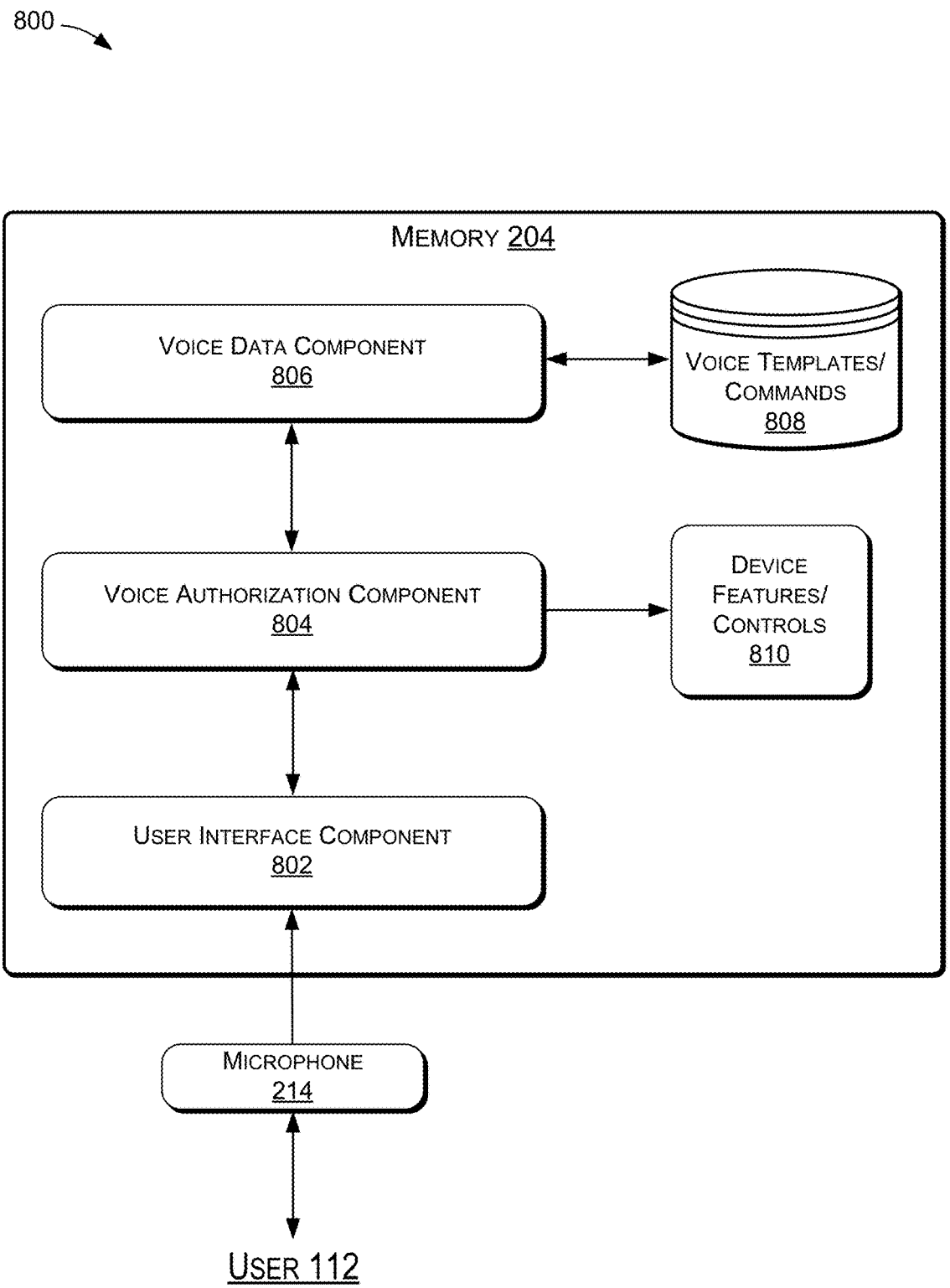
FIG. 8 illustrates a number of components of a computing device configured to receive and process voice commands, in accordance with certain techniques described herein.

FIG. 8 depicts a computing system 800 including selected portions of a computing device configured to receive, authorize, and process voice commands. In this examples, computing system 800 may correspond to a wireless device, which may be similar or identical to the wireless device 110 discussed above in reference to FIGS. 1-2. In various implementations, the wireless device 110 may be a smartphone, virtual assistant device, home automation device, etc., and may have an internal memory 204 In other examples, the computing system 800 may correspond to any type of user device configured to receive and process voice commands from a user (or speaker), including but not limited to a mobile phone, desktop computer, laptop, tablet computer, smart watch, home or vehicle based virtual assistance, wearable computing device, and/or any other personal computing device. In any of these examples, the memory 204 may include an internal and/or external memory associated with the computing device. Any combination of the components described within the memory 204 may be implemented within an internal memory of the computing device, or as a separate and remote component within a client-server architecture, cloud-based system, distributed computing environment, or the like.

In this example, the memory 204 includes a set of components configured process voice commands received from a user 112 of the device via the microphone 214. A user interface component 802 receives the voice input data of the voice command from the microphone 214, and provides the voice input data to a voice authorization component 804. The voice authorization component 804 may verify the user interface component 802, and then, after successfully verifying the user interface component 802, may transmit a request to a voice data component 806 for a voice template. The voice data component 806 may verify one or both of the user interface component 802 and the voice authorization component 804, and then after successfully verifying the component(s), retrieve a voice template (or voiceprint) from a voice template/command data store 808 and provide data representing the voice template back to the voice authorization component 804. The voice authorization component 804 then may compare the voice input data received from the user interface component 802, with the voice template received from the voice data component 806, to determine if the voice command matches an authorized voice template. When the voice authorization component 804 determines that the voice command matches an authorized voice template, it may transmit the voice command to one or more device features and/or controls 810 which may execute the voice command on the device.

The user interface component 802, voice authorization component 804, and voice data component 806 may be implemented as separate and independent components in some cases, which do not share memory or have access to the internal functions and memory of the other components. As described in more detail below, these implementations may improve security and provide technical advantages when authorizing voice commands. Such advantages may include preventing voice commands from unauthorized users, providing more robust control of voice command capabilities for different levels of authorized users, and protecting against malware and exposure to untrusted systems. For instance, in some implementations the configuration of the computing system 800 may ensure that the original voice templates of users are not provided to the user interface component 802, and that the voice command input is not provided to the voice data component 806. Additionally, the voice authorization component 804 may verify the user interface component 802 before requesting a voice template from the voice data component 806. The voice data component 806 also may independently verify the user interface component 802 and the voice authorization component 804, using separate sets of security credentials, to confirm that both the source of the voice command and the component requesting/comparing the voice template are authorized component.

As noted above, the voice authorization component 804 may be configured to receive and compare first voice data corresponding to the voice command input (e.g., a word or phrase spoken by the user 112), and second voice data corresponding to one or more voice template(s) retrieved from the voice template/command data store 808. These comparisons may be performed using voice verification technologies which may be implemented at any or all of the components depicted in the computing system 800. For instance, the user interface component 802 may be configured to perform analog to digital conversions on the voice command spoken by the user 112, and/or may determine a set of vocal characteristics of the user 112 (e.g., tone, pitch, cadence, etc.). The user interface component 802 also may incorporate voice recognition technologies to determine the particular words/phrases spoken in the voice command. The voice template/command data store 808 also may store combinations of user vocal characteristics and voice command words/phrases.

Accordingly, when comparing the voice command input to the voice templates, the voice authorization component 804 may compare both the user vocal characteristics and voice command words/phrases. In some examples, the voice authorization component 804 may determine that the voice command is an authorized command when the combination of the voice command words/phrases and the speakers vocal characteristics are identified as an authorized command within the voice template/command data store 808. If the words/phrases of the voice input match an authorized voice command (e.g., a functional command plus a user-specific voice passcode), but the speaker's vocal characteristics do not match the vocal characteristics of the user associated with the authorized voice command, this may indicate that an unauthorized user is speaking an authorized command, and the voice authorization component 804 may respond with a first type of error (e.g., locking the device and/or an email notification to the authorized user). As another example, if the vocal characteristics of the user 112 match the vocal characteristics of a voice template in the data store 808, but the words/phrases spoken in the voice input do not match an authorized voice command (e.g., a valid functional command with an incorrect passcode), this may indicate that an authorized user is speaking an unauthorized command, and the voice authorization component 804 may respond with a second type of error (e.g., a notification on the device with a hint/reminder of the correct passcode).

When the voice authorization component 804 verifies that the voice input data matches and authorized voice command, the speaker is an authorized user, and the authorized user is associated with the authorized voice command in the data store 808, then the voice authorization component 804 may forward the authorized command to the appropriate device features and/or controls 810 for execution of the voice command on the device. The device features and/or controls 810 can include any capability (e.g., feature or application of the device). In some examples, the device features and/or controls 810 can include a data capabilities control component (e.g., data controller 208) configured to disable/re-enable various data capabilities by coordinating with the various applications and features 210 and the device settings menus 212 of the device.

Although this example and various other examples described herein relate to receiving and processing voice commands from users, it can be understood from the context of this disclosure that the techniques described herein are also applicable to other types of commands (e.g., voice and non-voice commands). For instance, the components of the computer system 800 can be used similarly to receive a non-voice command (e.g., data request, authentication request, biometric data, password, security tokens, etc.) and determine whether the non-voice command is authorized or unauthorized for the user 112.

Additionally, although in this example the computing system 800 includes three separate components to implement the voice/command verification (e.g., a user interface component 802, a voice authorization component 804, and a voice data component 806), in other implementations a device/computing system 800 may include four separate components to provide additional security and protection against malware or exposure to untrusted systems or users. As an example, the functionality of the voice authorization component 804 may be split into two separate and independent components, in which a first component verifies the user interface component 802, and generates/transmits a voice template request to the voice data component 806, and a second component receives the voice template from the voice data component 806 and compares the voice template to the voice command input.

Figure 9:
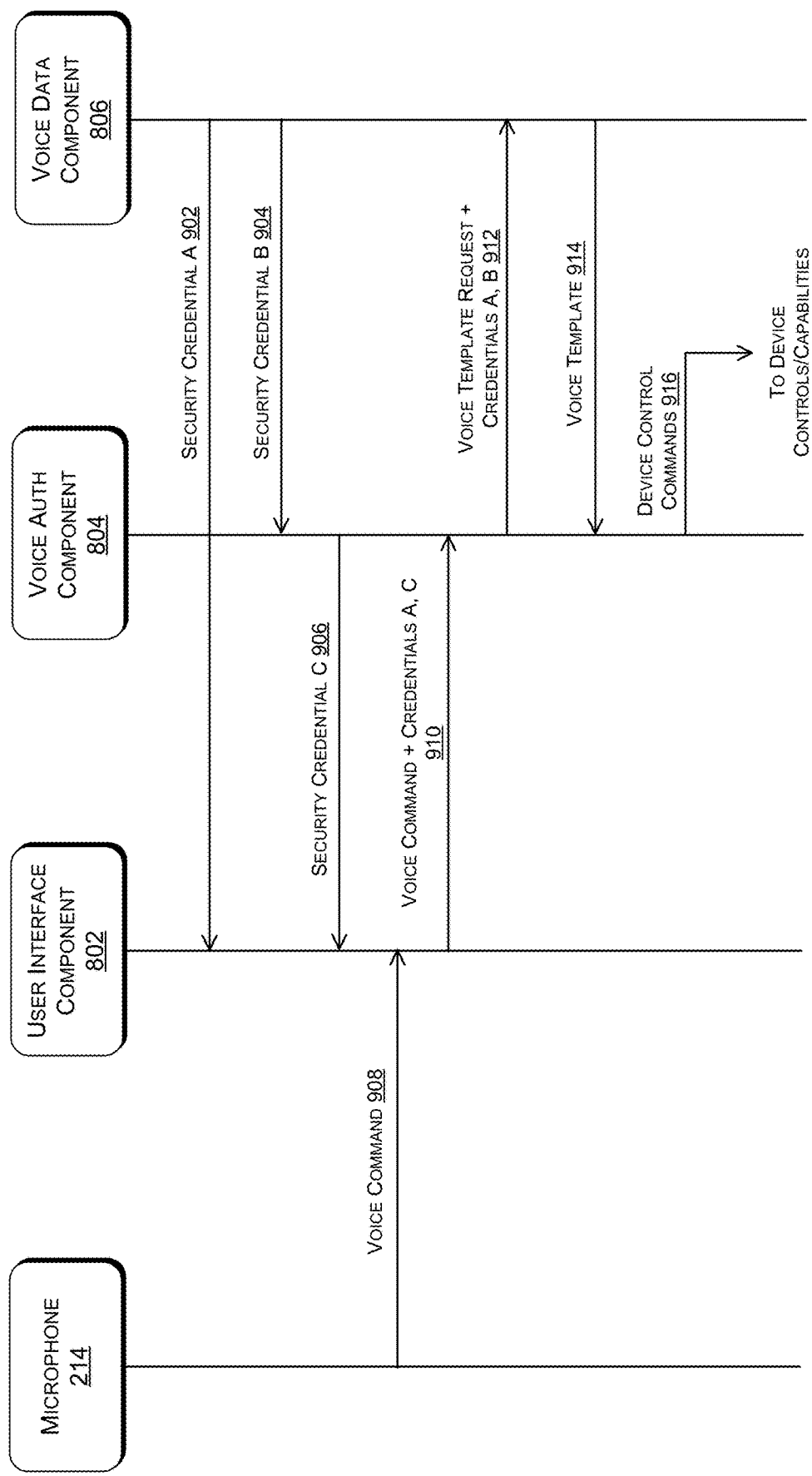
FIG. 9 is a swim lane diagram illustrating interactions between components within a computing device configured to receive and process voice commands, in accordance with certain techniques described herein.

FIG. 9 is a swim lane diagram illustrating an example process, implemented by components 802-806 of a computing device, for receiving and authorizing voice commands received via a microphone 214 of the device. Although this example illustrates a technique performed by three separate and independent components 802-806 within the computing device, as described above four separate components or other numbers of components may be used in other examples. Additionally, as noted above, although this example may relate to authorize voice commands received by a wireless device, similar or identical techniques may be used to authorizing other types of commands (e.g., commands with passwords, biometrics, etc.) and/or commands received by various types of devices.

At operation 902, the voice data component 806 may provide a first security credential (Credential A) to the user interface component 802. At operation 904, the voice data component 806 may provide a second security credential (Credential B) to the voice authorization component 804. At operation 906, the voice authorization component 804 may provide a third security credential (Credential C) to the user interface component 802. The security credentials provided in operations 902-906 may include any type of security credential, including but not limited to public/private encryption keys, shared secret values, sequence numbers, authentication tokens, etc. In this example, security credentials provided in operations 902-906 may correspond to a shared secret credential between two of the three components 802-806, and is not provided to the third component. For instance, Credential A may be a random number (or a set of corresponding public/private keys or other credentials) that is known to the user interface component 802 and the voice data component 806, but which might not be provided to the voice authorization component 804 and thus cannot be replicated or spoofed by the voice authorization component 804.

At operation 908, a voice command is provided from a user input device (e.g., microphone 214) of the computing device to the user interface component 802. The voice command provided in operation 908 may include data corresponding to the words or phrases spoken by the user 112 into the microphone 214. As noted above, the voice command provided to the user interface component 802 may be analog voice data and/or converted digital voice data. Additionally or alternatively, the voice command provided to the user interface component 802 may include data representing the vocal characteristics of the user 112 and the words/phrases spoken by the user 112.

After receiving the voice command data in operation 908, the user interface component 802 may generate data to transmit to the voice authorization component 804, which may include or be based on the voice command data, Security Credential A (associated with the voice data component 806), and Security Credential C (associated with the voice authorization component 804). In some examples, the user interface component 802 may build a data package including the digital voice command data (e.g., voice command words and/or user vocal characteristics), Security Credential A, and Security Credential C. Additionally or alternatively, the user interface component 802 may encode or encrypt the digital voice command data using Security Credential C, to generate a encoded/encrypted sequence number.

At operation 910, the user interface component 802 provides the voice command data (e.g., voice command words and/or user vocal characteristics), Security Credential A, and Security Credential C to the voice authorization component 804. As noted above, providing Security Credential C may be optional in some examples. When Security Credential C is provided, the voice authorization component 804 may use Security Credential C to verify that the user interface component 802 is an authentic component of the computing device. For example, the voice authorization component 804 can use a public or private key, or a shared secret associated with the user interface component 802, to verify that Security Credential C is a valid credential. By verifying the validity of Security Credential C, the voice authorization component 804 can confirm that the voice command data received in operation 910 is an authentic voice command request from an authentic user 112, and not a request from a separate untrusted system or malware.

After receiving the voice command data in operation 910 and verifying the user interface component 802, the voice authorization component 804 may transmit a voice template request to the voice data component 806 in operation 912. The voice template request may include or be based on the Security Credential A and Security Credential B. As noted above, the voice authorization component 804 might not store or have direct access to Security Credential A, which is a shared key or value between the user interface component 802 and the voice data component 806. Therefore, the voice authorization component 804 may use for Security Credential A the copy of the security credential provided by the user interface component 802 in operation 910. The voice authorization component 804 may retrieve the Security Credential B from an internal and/or secure storage, and add it to Security Credential A. To generate the voice template request, the voice authorization component 804 may build a data package including Security Credentials A and B, and/or may encode or encrypt one of the security credentials using the other security credential. For instance, Security Credential A and Security Credential B may be encryption keys or other large numbers, and the voice authorization component 804 may multiply the security credentials into a single value which can be transmitted with the voice template request.

As noted above, it may be advantageous not to provide the voice input data to the voice data component 806, but instead to use the voice authorization component 804 as an intermediary component that receives and compares voice command data with voice template data. Therefore, in some examples the voice template request provided in operation 912 may include data identifying the user and/or requested command on the computing device (e.g., a user identifier and/or command identifier), but might not include the specific voice input data within the voice command (e.g., the user's vocal characteristics and/or the user-specific secret phrase or passcode). In other examples, the voice template request may include the Security Credentials A and B but might not include any data indicating the user or the type of command on the computing device.

In operation 914, the voice data component 806 transmits one or more voice templates to the voice authorization component 804, in response to the voice template request received in operation 912. The voice templates transmitted in operation 914 can include previously stored sets of vocal characteristics (e.g., tone, pitch, cadence, etc.) for one or more users associated with the computing device. In some cases, a computing device might only have one associated user 112, and the voice template/command data store 808 may store a single voice template for the user. In other cases, a computing device might be shared by multiple users and the voice template/command data store 808 may store a voice template for each user.

Additionally, in some examples the voice template/command data store 808 may store multiple voice templates for each user. For instance, a user may have different voice templates associated with different commands on the computing device, where the different voice templates represent the user's vocal characteristics when speaking the particular words/phrases of the voice command. Voice templates also may include the associated words/phrases of the voice command, and optionally may include user-specific passcodes, passwords, or key phrases required for the user to perform the voice command.

Depending on the voice template request provided in operation 912, the voice data component 806 may transmit a single voice template or multiple voice templates in operation 914. For instance, if the voice template request includes data identifying the particular voice command spoken by the user 112, then the voice data component 806 may retrieve and transmit multiple voice templates associated with the particular voice command, for each user of the computing device. As another example, if the voice template request does not identify the particular voice command spoken but does include a particular user identifier for the user 112, then the voice data component 806 may retrieve and transmit voice templates associated with the particular user, for each different voice command and/or each different key phrase (e.g., passcode or password). As yet another example, if the voice template request includes data identifying the particular user 112 (e.g., a user identifier) and the particular voice command spoken (e.g., command words/phrases), then the voice data component 806 may retrieve and transmit a single voice template that is associated both with the particular user and the particular voice command on the computing device.

After receiving the voice template(s) provided in operation 914, the voice authorization component 804 may compare the voice template(s) to the voice input data received from the user interface component 802 in operation 910. In various different examples, the comparison performed by the voice authorization component 804 may include comparing the vocal characteristics of the voice input data with those of the voice template, or comparing the words/phrases of the voice command in the voice input data with the voice command words/phrases associated with the voice template, or comparing a key phrase spoken by the user (e.g., passcode or password) in the voice input data with a key phrase associated with the voice template, and/or any combination of these data comparisons. Additionally, if the voice authorization component 804 receives multiple voice templates in operation 914, then it may perform a comparison for each of the voice templates against the voice input data received from the user interface component 802.

In operation 916, the voice authorization component 804 may transmit one or more control commands to various device capabilities (e.g., applications, device features, internal functions and API, etc.), to implement the voice commands received from the user 112 in operation 908. As noted above, performing operation 916 may be based on the voice authorization component 804 successfully comparing the voice input data received from the user interface component 802 with at least one voice template received from the voice data component 806. In response to determining that the voice input data received from the user 112 matches the previously stored voice template associated with the same user 112, the voice authorization component 804 may determine that the voice command is an authentic command from an authorized user, and may transmit the corresponding instructions to the device capabilities to perform the command.

Figure 10:
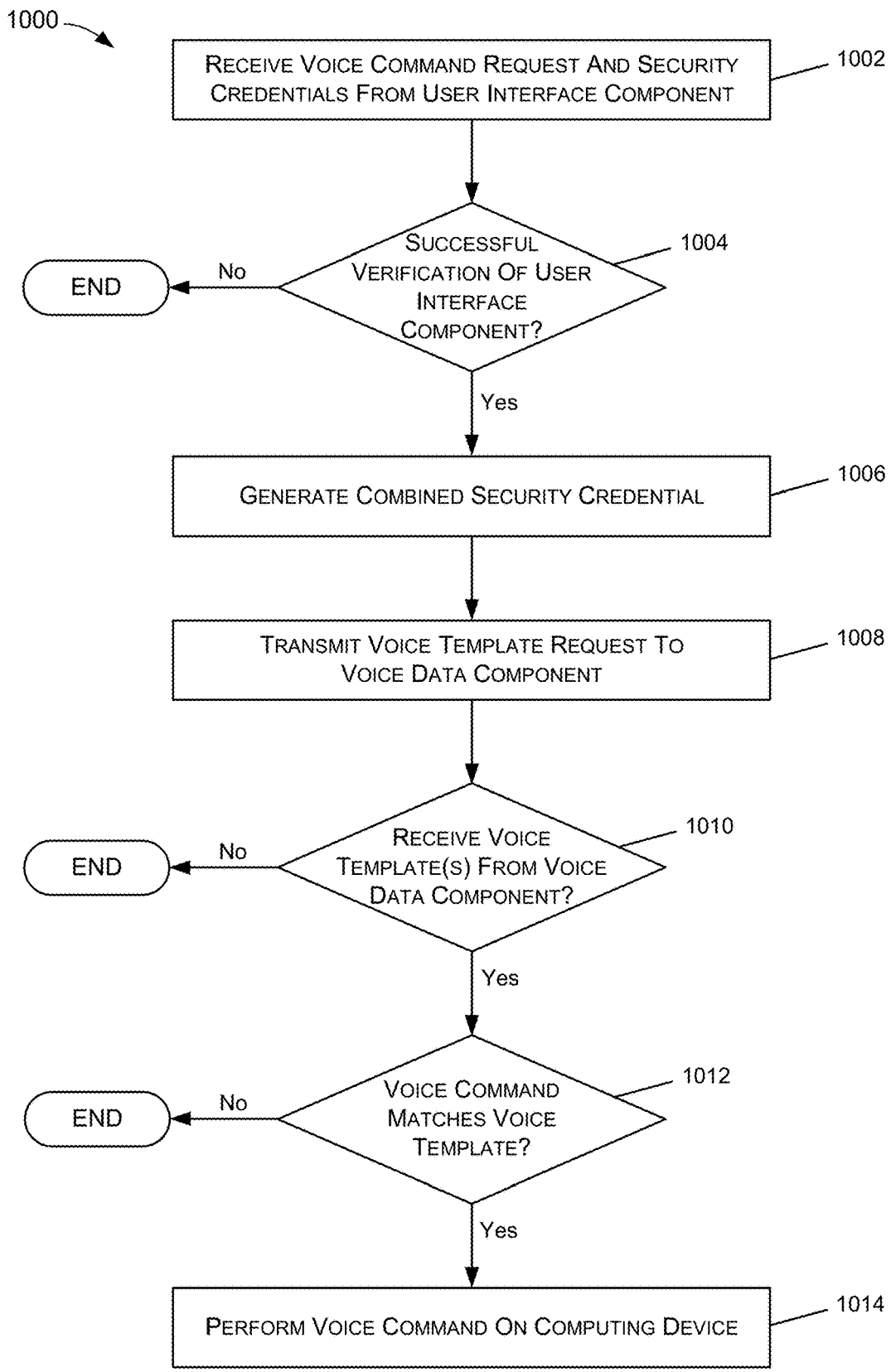
FIG. 10 is a flow diagram illustrating a process for receiving and authorizing voice commands by a user device, in accordance with certain techniques described herein.

FIG. 10 is a flow diagram illustrating an example process 1000 for receiving and authorizing voice commands received from a user on a computing device. In some examples, process 1000 may be performed by a voice authorization component within a computing device similar or identical to the voice authorization component 804 described above in FIGS. 8-9. As described above, the voice authorization component 804 may be implemented in between a user interface component 802 and a voice data component 806, and configured to receive and compare voice input data from a user 112 with a corresponding voice template(s) previously stored for the same user on the computing device. Thus, a voice authorization component 804 as described herein may provide advantages in security or processing voice commands on computing devices that are shared by multiple users and/or when one or more components of the computing devices (e.g., a front-end voice user interface or back-end voice template stored) may be affected by malware or exposed to untrusted users or systems.

Although process 1000 describes an example relating to receiving and processing voice commands, similar or identical techniques can be used to provide additional security and authorization when receiving and processing non-voice user commands on computing devices. For instance, the voice authorization component 804 may be implemented as an intermediary component configured to compare non-voice user input data and commands received from the user (e.g., passwords, biometric data, security tokens, etc.) with the corresponding user templates including user-specific security data previously stored in the secure memory of the device or on the network.

At operation 1002, the voice authorization component 804 receives a voice command request including security credentials from a user interface component 802. As noted above, the voice authorization component 804 and user interface component 802 may be implemented as separate and independent components on a user computing device that do not share memory or have access to the internal functions and memory of the other component. The voice command request received at operation 1002 may include voice command data, such as one or more words or phrases corresponding to an instruction to perform an operation on the computing device via an application, accessing a device feature, or executing a capability of the computing device. Additionally, the voice authorization component 804 may receive one or more security credential from the user interface component 802 in and/or associated with the voice command request. In some cases, two separate security credential(s) may be received from the user interface component 802: a first credential to allow the voice authorization component 804 to authenticate the user interface component 802 (which may be optional), and a separate second credential to allow the voice data component 806 to authenticate the user interface component 802. The security credentials may include, for example, public/private keys, sequence numbers, shared secret random values, etc., that enable secure communications between any components associated with the security credentials. Additionally, in the cases, the voice command request may include a key phrase, passcode, password spoken by the user, or other authentication data (e.g., biometric data) that can be verified to confirm that the voice command request is a valid request from an authorized user 112.

At operation 1004, the voice authorization component 804 may use the first security credential received in operation 1002 (e.g., a shared key or credential between the user interface component 802 and the voice authorization component 804), to verify the authenticity of the user interface component 802 and confirm that the voice command request is a valid request from a user 112 of the device. To verify the security credential in operation 1004, the voice authorization component 804 may retrieve and match a security credential stored its own internal memory with the first security credential received from the user interface component 802. Depending on the type of security credentials used, the matching may include compared shared values, decrypting an encrypted value with a public or private key to verify the corresponding key, etc. Because the first security credential is a shared credential associated with the user interface component 802 and the voice authorization component 804, any voice command received from a component other than the user interface component 802 (e.g., a malware component) may fail to verify and cause process 1000 to terminal (1004:No). In contrast, when the first security credential is successfully verified by the voice authorization component 804 (1004:Yes), the voice authorization component 804 is confident that the voice command request is an authentic request from the user interface component 802.

At operation 1006, after verifying that the request came from the valid user interface component 802, the voice authorization component 804 may generate a combined security credential to allow the voice data component 806 to authenticate both itself and the user interface component 802. The combined security credential generated in operation 1006 may include, or may be constructed based on, the second credential received in the voice command request in operation 1002 (e.g., a shared key or credential between the user interface component 802 and the voice data component 806), and a third credential stored securely the voice authorization component 804 (e.g., a shared key or credential between the voice authorization component 804 and the voice data component 806). Therefore, the combined security credential can be provided to the voice data component 806 to allow the voice data component 806 to verify the user interface component 802 using the second credential, and the voice authorization component 804 using the third credential.

To generate the combined security credential in operation 1006, the voice authorization component 804 may construct a voice template request that includes (or is based on) the second credential and third credential. In some cases, to obtain the second credential received in operation 1002, the voice authorization component 804 may decode or decrypt the second credential using a separate credential (e.g., the first security credential associated with the user interface component 802 and the voice authorization component 804). The combined security credential may be constructed using various techniques, including appending the second and third credentials as separate data values in a voice template request, or generating a single value based on the second and third credentials. For instance, the second and third credentials can be multiplied, or one credential may be used to encrypt another credential within the voice template request.

At operation 1008, the voice authorization component 804 transmits a voice template request, including the combined security credential generated in operation 1006, to the voice data component 806. As noted above, the combined security credential includes, or is based on, at least different two credentials that allows the voice data component 806 to independent verify the authenticity of the user interface component 802 using one credential(s) and the voice authorization component 804 using different credential(s). Further, because neither the user interface component 802 nor voice authorization component 804 has independent access to the security credential of the other, neither the user interface component 802 nor voice authorization component 804 can spoof the other component by providing proper credentials to the voice data component 806.

As discussed above, in various examples the voice template request from the voice authorization component 804 may or not may include data identifying the user (e.g., a user identifier). The voice template request also may or not may include data identifying the command spoken by the user (e.g., a command identifier). However, it may be advantageous for device security and prevention of malware for the voice template request not to include particular voice input data, such as the vocal characteristics of the user 112 and/or any key phrases, passwords, or passcodes spoken by the user as authorization for the voice command. When the voice template request includes a user identifier and/or a command identifier, the voice data component 806 may use the identifier(s) to select the associated voice template(s) from the voice template/command data store 808, to return to the voice authorization component 804 for comparison with the voice input data.

At operation 1010, the voice authorization component 804 may or may not receive voice template(s) from the voice data component 806. For example, when the computing device has not been configured or authorized to support the requested voice command by the current user 112 of the device, then the voice template/command data store 808 might not store any voice templates to be compared with the voice input data of the voice command. For instance, if one or more users (e.g., parents, device admins, etc.) are authorized to issues voice commands on the computing device, but the current user 112 (e.g., a child, guest user, etc.) is not, then the voice data component 806 might not return a voice template. As another example, if voice commands are authorized for some capabilities on the computing device but not for the capability requested by the voice command in operation 1002, then the voice data component 806 might not return a voice template. In these examples, the voice data component 806 may return an error or an empty set identifier to the voice authorization component 804, indication that this is no voice template stored on the device to authorize the requested voice command (1010:No). In this case, when the voice data component 806 fails to return a voice template, the voice authorization component 804 may terminate the process without issuing the requested voice command.

When the voice data component 806 returns one or more voice templates in response to the voice template request (1010:Yes), then at operation 1012 the voice authorization component 804 may compare the voice input data received from the user 112 to the voice template(s) received from the voice data component 806. The comparison of the voice input data to voice template(s) may include comparing the vocal characteristics of the voice input data received with the voice command request in operation 1002, with the corresponding vocal characteristics of each voice template received in operation 1010. The voice authorization component 804 may use similarity thresholds for individual vocal characteristics (e.g., tone, pitch, cadence, etc.) or combinations of vocal characteristics to determine with a sufficient confidence level that the voice template is associated with the speaker of the voice command. Additionally or alternatively, the comparison in operation 1012 may include comparing a specific key phrase (e.g., password or passcode) spoken by the user 112 with the voice command, to a corresponding key phrase stored in the voice template/command data store 808 with the voice template associated with the same user. Further, in some examples different voice templates within the voice template/command data store 808 may be associated with different types of commands on the computing device (e.g., different applications, device features, functions and/or API calls, etc.), and comparing the voice template to the voice input data in operation 1012 may include comparing the requested voice command with the command type(s) within (or associated with) the voice templates received in operation 1010.

In some examples, the voice authorization component 804 also may implement a geofencing functionality associated with particular device users and/or voice command requests on the computing device. For example, a voice template associated with a user 112 may include a geofence region defining an area within which the user 112 is permitted to perform voice commands on the data. In such examples, in operation 1012 the voice authorization component may determine a current location of the device (e.g., GPS coordinates, current county, state or other jurisdiction, etc.) and may compare the device's current location to the geofence region associated with the speaker. When implementing a geofence for voice commands associated with a particular user, the voice authorization component 804 may reject the voice command spoken by the user 112, even if the user 112 is authorized to perform the requested voice command, based device being outside of the geofence region associated with the user 112 when the voice command was spoken.

When the requested voice command received in operation 1002 matches a voice template received in operation 1010 with a sufficient confidence level (1012:Yes), then at operation 1014 the voice authorization component 804 may cause the voice command to be performed on the computing device. For example, the voice authorization component 804 may forward the authorized command to the appropriate application, device feature, and/or controls 810 to be executed on the device. As noted above, the types of voice commands performed in operation 1014 may include any capabilities of the device for which voice commands are configured and authorized to perform.

In contrast, when none of the voice templates received in operation 1010 sufficiently match the voice input data of the voice command request in operation 1002 (1012:No), then process 1000 may terminate without performing the requested voice command on the device. For instance, the voice authorization component 804 may initiate a voice response or visual notification on the device to indicate that the current user 112 is not authorized to perform the requested voice command. In some cases, a voice response or visual notification may include locking the device, requesting that the current user provide additional authorization (e.g., a password or key phrase), and/or indicating that a different user (e.g., a parent or device owner) is required to authorize the requested voice command.

Figure 11:
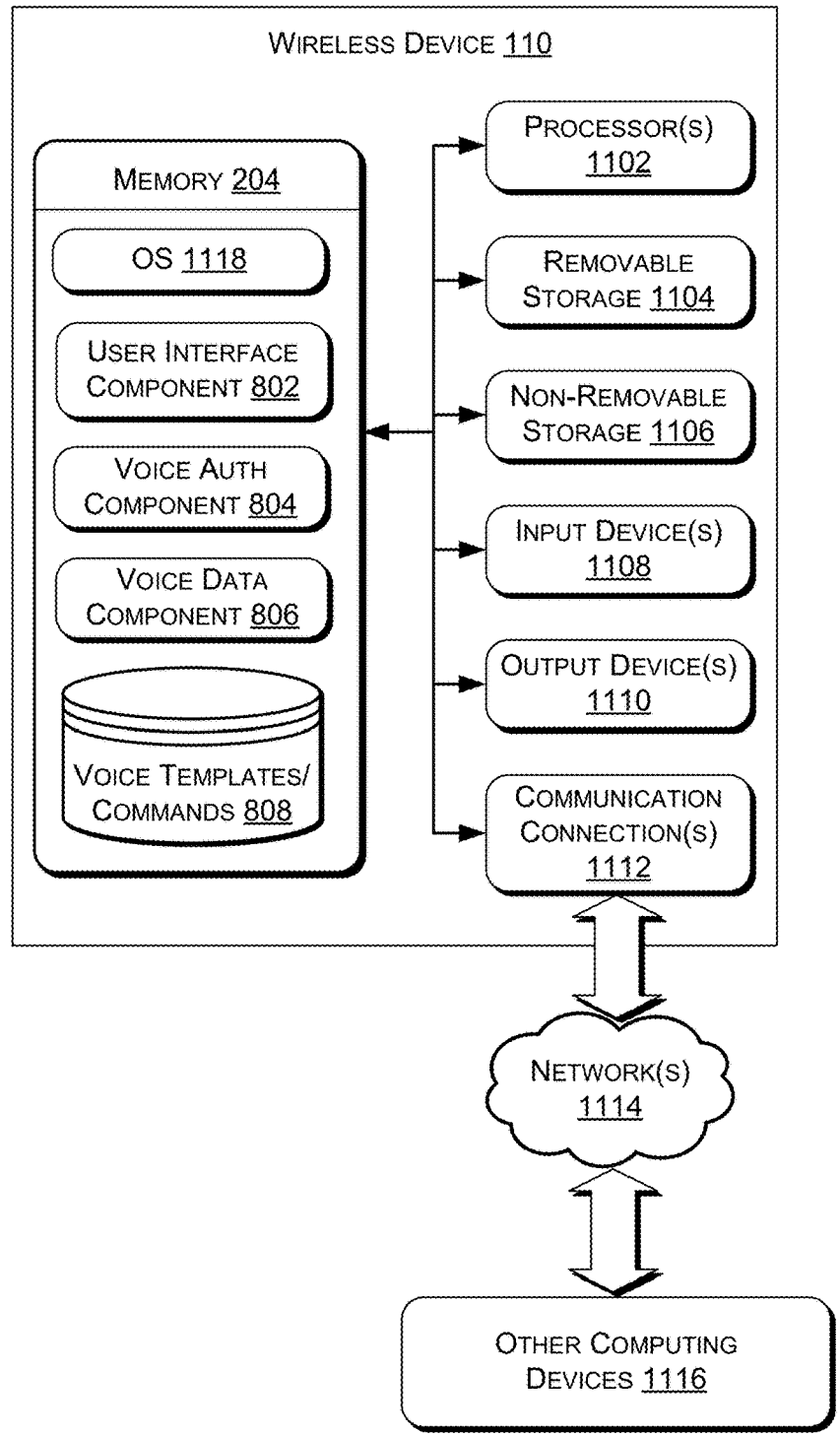
FIG. 11 is a block diagram illustrating various components of a wireless device, in which certain techniques described herein may be implemented.

FIG. 11 is a block diagram of an example architecture 1100 of a wireless device 110 in accordance with various embodiments. In some implementations, wireless device 110 in FIG. 11 may correspond to the wireless devices 110 depicted in FIGS. 1 and 2. In other examples, the architecture 1100 depicted in FIG. 11 need not be implemented as a wireless device 110 but may correspond to various other types of user computing devices, such as mobile phones, desktop computers, laptop or tablet computers, smart watches, wearable computing devices, and/or any other personal computing device. As shown in this example, the wireless device 110 may include one or more processors 1102, which may include one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Wireless device also may include one or more forms of computer-readable memory 204, and additional storage devices such as removable storage 1104 and/or non-removable storage 1106.

The wireless device 110 may further include one or more input devices 1108, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user (e.g., microphone 214), pointing devices (e.g., mouse, pen, stylus, etc.), or any other suitable input devices 1108 coupled communicatively to the processor(s)

1102 and the computer-readable memory 204. The wireless device 110 also may include one or more output devices 1110, including, without limitation, a display (e.g., display screen 226), speakers, a printer, or any other suitable output device coupled communicatively to the processor(s) 1102 and the computer-readable memory 204.

Additionally, the wireless device 110 may include communications connection(s) 1112 (e.g., network interfaces 202) that allow the wireless device 110 to communicate with various other computing devices 816, such as other wireless devices, web servers and/or application servers, via one or more communication networks 1114. Communication networks 1114 may include, for example, the WiFi network 114, cellular network 116, and/or various other communication networks (e.g., Bluetooth, NFC, satellite networks, etc.). The communications connection(s) 1112 may facilitate transmitting and receiving wireless signals over any suitable wireless communications/data technology, standard, or protocol, as described above, such as using licensed, semi-licensed, or unlicensed spectrum over wireless and telecommunications networks. For example, the communication connection(s) 1112 may include one or more of a wireless (e.g., IEEE 802.1x-based) interface (e.g., WiFi antenna 222), a cellular radio interface (e.g., cellular antenna 224), a Bluetooth interface and antenna, and so on.

In various embodiments, some or all of the computer-readable memory 204, removable storage 1104, and non-removable storage 1106 may comprise non-transitory computer-readable memory that generally includes both volatile memory and non-volatile memory (e.g., random access memory (RAM), read-only memory (ROM), erasable programmable read-only memory (EEPROM), flash memory, miniature hard drive, memory card, optical storage, magnetic cassettes, magnetic tape, magnetic disk storage or other magnetic storage devices, or any other medium). The computer-readable memory 204 also may be described as computer storage media and may include volatile and nonvolatile, removable and non-removable media implemented in any method or technology for storage of information, such as computer readable instructions, data structures, program modules, or other data. The computer-readable memory 204 may store include various types of instructions and data, such as an operating system 1118 for the wireless device 110, device drivers, and various device applications implemented in software and/or firmware. The processor-executable instructions within the computer-readable memory 204 can be executed by the processors 1102 to perform the various functions described herein. For instance, the computer-readable memory 204 may store a user interface component 802, voice authorization component 804, voice data component 806, and/or a voice templates/command data store 808 similar or identical to those described above in reference to FIG. 8.

Communication networks 1114 may include one or more networks, such as a WiFi network 114 and a cellular network 116. WiFi networks 114 can include one or more core network(s) connected to terminal(s) via one or more access network(s). Example access networks may include LTE, WIFI, GSM Enhanced Data Rates for GSM Evolution (EDGE) Radio Access Network (GERAN), UTRAN, and other cellular access networks. Message transmission, reception, fallback, and deduplication can be performed, e.g., via 5G, 4G, LTE, 5G, WIFI, and/or other networks. Cellular networks 116 can provide wide-area wireless coverage using one or more technologies such as GSM, Code Division Multiple Access (CDMA), UMTS, LTE, NR, or the like. Example communication networks 1114 may include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the wireless device 110 and other computing devices 1116 can additionally or alternatively be performed using other technologies, such as wired (Plain Old Telephone Service, POTS, or PSTN lines), optical (e.g., Synchronous Optical NETwork, SONET) technologies, and the like.

The communication networks 1114 may include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In various implementations, the cellular network 116 and/or the WiFi network 114 can carry voice or data. For example, the communication networks 1114 can carry voice traffic using VoIP or other technologies as well as data traffic, and/or may carry data packets using HSPA, LTE, or other technologies as well as voice traffic. Some communication networks 814 may carry both data and voice in a PS format. For example, many LTE networks carry voice traffic in data packets according to the VoLTE standard.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed (or may be omitted entirely), and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A computing device comprising:
   one or more processors; and
   memory storing executable instructions that, when executed by the one or more processors, cause the one or more processors to perform operations comprising:
   receiving, by a voice authorization component of the computing device, a command request from a user interface component of the computing device, the command request including voice input data;
   receiving, by the voice authorization component, a first credential from the user interface component;
   retrieving a second credential associated with the voice authorization component;
   generating, by the voice authorization component, a voice template request based at least in part on the first credential and the second credential;
   transmitting, by the voice authorization component, the voice template request to a voice data component;
   receiving, by the voice authorization component and from the voice data component, a voice template; and
   processing, by the voice authorization component, the command request, based at least in part on the voice input data and the voice template.

2. The computing device of claim 1, wherein generating the voice template request comprises:
generating a combined credential based at least in part on the first credential and the second credential.

3. The computing device of claim 1, the operations further comprising:
   receiving, by the voice authorization component, a third credential from the user interface component; and
   verifying, by the voice authorization component, the user interface component based at least in part on the third credential,
   wherein transmitting the voice template request is based at least in part on verifying the user interface component.

4. The computing device of claim 1, the operations further comprising:
   retrieving, by the voice data component, the voice template from a secure storage of the computing device; and
   providing, by the voice data component, the voice template to the voice authorization component.

5. The computing device of claim 1, the operations further comprising:
   retrieving, by the voice data component, the voice template from a remote storage via a wireless network; and
   providing, by the voice data component, the voice template to the voice authorization component.

6. The computing device of claim 1, the operations further comprising:
   determining a voice command based on the voice input data, wherein generating the voice template request is further based on the voice command.

7. The computing device of claim 1, the operations further comprising:
   determining a location associated with the computing device; and
   comparing the location to a geofence region associated with the voice authorization component,
   wherein transmitting the voice template request to the voice data component is based at least in part on comparing the location to the geofence region.

8. The computing device of claim 1, the operations further comprising:
   determining one or more device features or applications on the computing device, based on the voice input data; and
   disabling a data receiving capability of the computing device for the one or more device features or applications, and disabling cellular data usage for the one or more device features or applications.

9. A method comprising
   receiving, from a first component of a computing device, by a second component of the computing device, a command request including user input data;
   receiving, by the second component, a first security credential from the first component;
   retrieving a second security credential associated with the second component;
   generating a user template request based at least in part on the first security credential and the second security credential;
   transmitting the user template request from the second component to a third component of the computing device;
   receiving, by the second component and from the third component, a user template;
   comparing, by the second component, the user input data and the user template; and processing the command request based at least in part on a result of comparing the user input data and the user template.

10. The method of claim 9, wherein generating the user template request comprises:
generating a combined credential based at least in part on the first security credential and the second security credential.

11. The method of claim 9, further comprising:
receiving, by the second component, a third security credential from the first component; and
verifying, by the second component, the first component based at least in part on the third security credential,
wherein transmitting the user template request is based at least in part on verifying the first component.

12. The method of claim 9, further comprising:
retrieving, by the third component, the user template from a secure storage of the computing device; and
providing, by the third component, the user template to the second component.

13. The method of claim 9, further comprising:
retrieving, by the third component, the user template from a remote storage via a wireless network; and
providing, by the third component, the user template to the second component.

14. The method of claim 9, further comprising:
determining a command type based on the user input data, wherein generating the user template request is further based on the command type.

15. The method of claim 9, further comprising:
determining a location associated with the computing device; and
comparing the location to a geofence region associated with the second component,
wherein transmitting the user template request to the third component is based at least in part on comparing the location to the geofence region.

16. The method of claim 9, further comprising:
determining one or more device features or applications on the computing device, based on the user input data; and
disabling a data receiving capability of the computing device for the one or more device features or applications, and disabling cellular data usage for the one or more device features or applications.

17. One or more non-transitory computer-readable media storing instructions that, when executed, cause one or more processors to perform acts comprising:
receiving, by a voice authorization component, a voice command request from a user interface component, the voice command request including voice input data;
receiving, by the voice authorization component, a first credential from the user interface component;
retrieving a second credential associated with the voice authorization component;
generating, by the voice authorization component, a voice template request based at least in part on the first credential and the second credential;
transmitting, by the voice authorization component, the voice template request to a voice data component;
receiving, by the voice authorization component and from the voice data component, a voice template; and
processing, by the voice authorization component, the voice command request, based at least in part on the voice input data and the voice template.

18. The non-transitory computer-readable media of claim 17, wherein generating the voice template request comprises:
generating a combined credential based at least in part on the first credential and the second credential.

19. The non-transitory computer-readable media of claim 17, the acts further comprising:
receiving, by the voice authorization component, a third credential from the user interface component; and
verifying, by the voice authorization component, the user interface component based at least in part on the third credential,
wherein transmitting the voice template request is based at least in part on verifying the user interface component.

20. The non-transitory computer-readable media of claim 17, the acts further comprising:
determining a location associated with the voice authorization component; and
comparing the location to a geofence region associated with the voice authorization component,
wherein transmitting the voice template request to the voice data component is based at least in part on comparing the location to the geofence region.

* * * * *